(12) United States Patent
Wang et al.

(10) Patent No.: US 11,239,768 B2
(45) Date of Patent: Feb. 1, 2022

(54) LIQUID DROPLET POWERED ELECTRICITY GENERATOR

(71) Applicant: City University of Hong Kong, Hong Kong (CN)

(72) Inventors: Zuankai Wang, Hong Kong (CN); Wanghuai Xu, Hong Kong (CN); Huanxi Zheng, Hong Kong (CN)

(73) Assignee: CITY UNIVERSITY OF HONG KONG, Hong Kong (CN)

( * ) Notice: Subject to any disclaimer, the term of this patent is extended or adjusted under 35 U.S.C. 154(b) by 0 days.

(21) Appl. No.: 16/662,121

(22) Filed: Oct. 24, 2019

(65) Prior Publication Data
US 2021/0126556 A1    Apr. 29, 2021

(51) Int. Cl.
*H02N 1/04*    (2006.01)

(52) U.S. Cl.
CPC .................................... *H02N 1/04* (2013.01)

(58) Field of Classification Search
CPC .. H02N 1/04; H02N 1/06; H02N 1/00; H02N 1/08
USPC .................................................. 310/309, 310
See application file for complete search history.

(56) References Cited

U.S. PATENT DOCUMENTS

| | | | | |
|---|---|---|---|---|
| 10,848,079 B2 * | 11/2020 | Ma | ........................... | H02N 1/08 |
| 2016/0040648 A1 * | 2/2016 | Wang | ...................... | H02H 1/04 |
| | | | | 290/42 |
| 2016/0218640 A1 * | 7/2016 | Wang | ...................... | H02N 1/04 |

FOREIGN PATENT DOCUMENTS

WO    WO2015154693    * 10/2015

OTHER PUBLICATIONS

Huynh, D H et al. "Environmentally friendly power generator based on moving liquid dielectric and double layer effect." Scientific reports vol. 6 26708. Jun. 3, 2016, doi:10.1038/srep26708 (Year: 2016).*
PTFE from Wikipedia.org (Year: 2021).*
Z. Lin, et al., "Harvesting Water Drop Energy by a Sequential Contact-Electrification and Electrostatic-Induction Process", Adv. Mater., 2014, 26, pp. 4690-4696.
S. Jeon, et al., "Self-cleaning hybrid energy harvester to generate power from raindrop and sunlight", Nano Energy, 2015, 12, pp. 636-645.

(Continued)

*Primary Examiner* — Ahmed Elnakib
(74) *Attorney, Agent, or Firm* — Melvin S. Li; Heslin Rothenberg Farley & Mesiti, P.C.

(57) ABSTRACT

The present invention is concerned with an electricity generator. The generator resembles a transistor and powered by impacting liquid such as water droplets. The generator has a glass substrate defining an upwardly facing surface and a downwardly facing surface. The substrate includes i) a region with polytetrafluoroethylene (PTFE) coated on the upwardly facing surface and acting as a virtual source and ii) an electrode arranged adjacent said PTFE coated region on the upwardly facing surface and acting as a drain in that the PTFE coated region and the electrode are positioned on the upwardly facing surface to receive an impacting water droplet acting as a gate, and wherein circuitry of the generator connects the virtual source and the drain via an electrical connection passing the downwardly facing surface, and electricity is harvested via the electrical connection.

5 Claims, 18 Drawing Sheets
(18 of 18 Drawing Sheet(s) Filed in Color)

(56) References Cited

OTHER PUBLICATIONS

J. Xiong, et al., "Wearable All-Fabric-Based Triboelectric Generator for Water Energy Harvesting", Adv. Energy Mater., 2017, 1701243, 10 pgs.

S. Jin, et al., "Large-Area Direct Laser-Shock Imprinting of a 3D Biomimic Hierarchical Metal Surface for Triboelectric Nanogenerators", Adv. Mater., 2018, 1705840, 9 pgs.

W. Xu, et al., "SLIPS-TENG: robust triboelectric nanogenerator with optical and charge transparency using a slippery nterface", National Science Review, 2019, 6, pp. 540-550.

S. Kwon, et al., "An effective energy harvesting method from a natural water motion active transducer", Energy and Environmental Science, 2014, vol. 7, No. 10, pp. 3279-3283.

Z. Wang, "NewWave power", Nature, 2017, vol. 542, pp. 159-160.

G. Zhu, "Harvesting Water Wave Energy by Asymmetric Screening of Electrostatic Charges on a Nanostructured Hydrophobic Thin-Film Surface", ACS NANO, 2014, vol. 8, No. 6, pp. 6031-6037.

J. Scruggs, et al., "Harvesting Ocean Wave Energy", Science, 2009, vol. 323, pp. 1176-1178.

P. Dhiman, et al., "Harvesting Energy from Water Flow over Graphene", Nano Lett., 2011, 11, pp. 3123-3127.

B. Logan et al., "Membrane-based processes for sustainable power generation using water", Nature, Aug. 16, 2012, vol. 488, pp. 313-319.

A. Siria, et al., "Giant osmotic energy conversion measured in a single transmembrane boron nitride nanotube", Nature, Feb. 28, 2013, vol. 494, pp. 455-458.

X. Chen, et al., "Scaling up nanoscale water-driven energy conversion into evaporation-driven engines and generators", Nature Communications, Jun. 16, 2015, pp. 1-7.

J. Feng, et al., "Single-layer MoS2 nanopores as nanopower generators", Nature, 2016, 15 pgs.

T. Schroeder, et al., "An electric-eel-inspired soft power souice from stacked hydrogels", Nature, Dec. 14, 2017, vol. 552, 15 pgs.

G. Xue, et al., "Water-evaporation-induced electricity with nanostructured carbon materials", Nature Nanotechnology, Jan. 30, 2017, 6 pgs.

Y. Huang, et al., "Interface-mediated hygroelectric generator with an output voltage approaching 1.5 volts", Nature Communications, 2018, 8 pgs.

P. Horowitz, et al., "The Art of Electronics—2nd Edition", Cambridge University Press, 1989, 1100 pgs.

J. Yin, et al., "Generating electricity by moving a droplet of ionic liquid along graphene", Nature Nanotechnology, May 2014, vol. 9, pp. 378-383.

Y. Xie et al., "High-efficiency ballistic electrostatic generator using microdroplets", Nature Communications, Apr. 7, 2014, 5 pgs.

J. Park, et al., "Influences of Surface and Ionic Properties on Electricity Generation of an Active Transducer Driven by Water Motion", J. Phys. Chem. Lett., 2015, 6, pp. 745-749.

T. Krupenkin, et al., "Reverse electrowetting as a new approach to high-power energy harvesting", Nature Communications, Aug. 23, 2011, 8 pgs.

J. Nie, et al., "Power generation from the interaction of a liquid droplet and a liquid membrane", Nature Communications, 2019, 10 pgs.

Q. Sun, et al., "Surface charge printing for programmed droplet transport", Nature Materials, Sep. 2019., vol. 18, pp. 936-941.

L.L. Cui, et al., "The comparative studies of charge storage stabilities among three PP/porous PTFE/PP electret", Journal of Electrostatics, 2009, 67, pp. 412-416.

Yatsuzuka, et al., "Electrification phenomena of pure water droplets dripping and sliding on a polymer surface", Journal of Electrostatics, 1994, 32, pp. 157-171.

Zhao, P., et al., "Emulsion Electrospinning of Polytetrafluoroethylene (PTFE) Nanofibrous Membranes for High-Performance Triboelectric Nanogenerators", ACS Appl. Mater. Interfaces, 2018, 10, pp. 5880-5891.

S. Wang, et al., "Maximum Surface Charge Density for Triboelectric Nanogenerators Achieved by Ionized-Air Injection: Methodology and Theoretical Understanding", Adv. Mater., 2014, 26, pp. 6720-6728.

Y. Liu, et al., "Pancake bouncing on superhydrophobic surfaces", Nature Physics, Jul. 2014, vol. 10, pp. 515-519.

J. Bird, et al., "Reducing the contact time of a bouncing drop", Nature, Nov. 21, 2013, vol. 503, 14 pgs.

D. Richard, et al., "Contact time of a bouncing drop", Nature, Jun. 20, 2002, vol. 417, pp. 811-812.

D. Bartolo, et al., "Retraction dynamics of aqueous drops upon impact on non-wetting surfaces", J. Fluid Mech., 2005, vol. 545, pp. 329-338.

W. Nelson, et al., "Droplet Actuation by Electrowetting-on-Dielectric (EWOD): A Review", Journal of Adhesion Science and Technology, 2012, 26:12-17, pp. 1747-1771 (26 pgs.).

H. J. J. Verheijen, et al., "Reversible Electrowetting and Trapping of Charge: Model and Experiments", Langmuir, 1999, 15, pp. 6616-6620.

J.K. Moon, et al., "Electrical power generation by mechanically modulating electrical double layers", Nature Communications, Feb. 12, 2013, 6 pgs.

J. Park, et al., "Identification of Droplet-Flow-Induced Electric Energy on Electrolyte-Insulator-Semiconductor Structure Junwoo Park", J. Am. Chem. Soc., 2017, 139, pp. 10968-10971.

R. Kjellander, et al., "Correlation and Image Charge Effects in Electric Double Layers", Chemical Physics Letters, Nov. 23, 1984, vol. 112, No. 1, pp. 49-53.

V. Nguyen, et al., "Effect of humidity and pressure on the triboelectric nanogenerator", Nano Energy, 2013, 2, pp. 604-608.

E. Matito, et al., "The aromatic fluctuation index (FLU): A new aromaticity index based on electron delocalization", The Journal of Chemical Physics, 2005, 122, 014109, 9 pgs.

S. Koneshan, et al., "Solvent Structure, Dynamics, and Ion Mobility in Aqueous Solutions at 25 °C", J. Phys. Chem. B, 1998, 102, pp. 4193-4204.

* cited by examiner

LIQUID DROPLET POWERED ELECTRICITY GENERATOR

FIELD OF THE INVENTION

The present invention is concerned with an electricity generator powered by liquid or more specifically impacting liquid such as water droplets. The present invention is also concerned with systems comprising such generators and methods of manufacture of such systems and generators.

BACKGROUND OF THE INVENTION

Manifested in a wide spectrum of forms and dynamics at various scales, hydrodynamic energy is one of the most abundant, affordable and sustainable energy sources in the world. While extensive efforts have been made to harvest hydrodynamic energy in the format of raindrop, river/ocean wave, tide and others, achieving high output power density of electricity generation remains challenging.

The present invention seeks to provide an improved generator which makes use of energy from impacting liquid to generate electrically, or at least to provide an alternative to the public.

SUMMARY OF THE INVENTION

According to a first aspect of the present invention, there is provided an electricity generator resembling a transistor and powered by impacting liquid droplets, comprising a glass substrate defining an upwardly facing surface and a downwardly facing surface, wherein the substrate includes i) a region with polytetrafluoroethylene (PTFE) coated on the upwardly facing surface and acting as a virtual source and ii) an electrode arranged adjacent the PTFE coated region on the upwardly facing surface and acting as a drain in that the PTFE coated region and the electrode are positioned on the upwardly facing surface to receive an impacting water droplet acting as a gate, and wherein circuitry of the generator connects the virtual source and the drain via an electrical connection passing the downwardly facing surface, whereby electricity is harvested via the electrical connection.

Preferably, the glass substrate may be an ITO glass slide or a portion of an ITO glass slide.

Suitably, the PTFE may be conformed to exist in form of a flat film on the upwardly facing surface. The PTFE film may have a density of 2.1 to 2.2 g/cm$^3$. Studies leading to the present invention have shown that this density range can enhance the performance of the generator.

Advantageously, the electrode may be a conductive Al tape.

According to a second aspect of the present invention, there is provided an electricity generator system comprising a plurality of electricity generators as described above, wherein the generators are connected in series or in parallel.

According to third aspect of the invention, there is provided a method of manufacture of an electricity generator system, comprising making a plurality of electricity generators, the making of the electricity generators including steps of:

providing a glass slide with a thickness of substantially 0.40 to 1.0 mm defining an upwardly facing surface and a downwardly facing surface;

heating the glass substrate to a temperature of substantially 120 to 150° C. for 15 to 20 mins;

forming a virtual source by coating a layer of polytetrafluoroethylene (PTFE) to a region of the upwardly facing surface coated;

forming drain by providing an electrode arranged adjacent the PTFE coated region on the upwardly facing surface in that the PTFE coated region and the electrode are positioned on the upwardly facing surface to receive an impacting water droplet acting as a gate; and connecting the virtual source and the drain via an electrical connection passing the downwardly facing surface, whereby electrical is harvestable via said electrical connection.

Preferably, the method may comprise a step of connecting the plurality of electricity generators in series or parallel.

Suitably, the glass substrate may be an ITO glass slide or a portion of an ITO glass slide.

The electrode may be a conductive Al tape.

BRIEF DESCRIPTION OF DRAWINGS

The patent of application file contains at least one drawing executed in color. Copies of this patent or patent application publication with color drawing(s) will be provided by the Office upon request and payment of the necessary fee.

Some embodiments of the present invention will now be explained, with reference to the accompanied drawings, in which:—

FIGS. 1a to 1c illustrate an embodiment of an electricity generator, or a transistor-like impinging liquid electricity generator (TIDE-G), in which:

FIG. 1a schematically illustrates an n-channel field effect transistor consisting of source, drain, gate and substrate terminals.

FIG. 1b is a schematic diagram of a TIDE-G, in that a transparent ITO, Al electrode and water droplet serve as the source, drain and gate, respectively, and polytetrafluoroethylene (PTFE), an electret material found to produce a promising effect during the course of the invention, is designed on the top of ITO to serve as a virtual and rich source that allows for the electrostatic induction of charges on the ITO for the reversible charge transfer. Before the impinging water droplet engages the TIDE-G, the gate channel between the source and drain is absent. In this switching-off state/mode, there is no current output (please see top portion of figure). By comparison, in the switching-on state, the source and drain are connected by the spreading droplet, yielding a significant electricity generation (please see bottom portion of figure).

FIG. 1c is a graph showing that, with the progression of continuous impinging of individual droplets, there is a gradual increase in the charges on the PTFE surface of as-fabricated TIDE-G device.

FIGS. 2a to 2c provides an electricity generation characterization of the present invention, in which:

FIG. 2a is an optical image showing four parallel TIDE-G devices fabricated on a glass substrate (please see left portion of figure). Each droplet impinging on an individual TIDE-G device lights up 100 commercial LEDs (please see right portion of figure).

FIG. 2b is a graph illustrating that under the same conditions such as the size and release height of continuous impinging of individual droplets, the voltage output measured from TIDE-G (in red) is over two orders of magnitude higher than that on the control TENG device. The negligible electricity generation from triboelectric nanogenerator (TENG) is limited by the interfacial effect, though its PTFE surface is loaded with sufficient charges as in the case of TIDE-G. The frequency of impinging droplets is set at 4.2 Hz.

FIG. 2c is a graph illustrating a comparison of current output from TIDE-G (right portion of figure) and the control device (left portion of figure) in response to continuous impinging of individual droplets.

FIGS. 3a to 3d illustrates an origin of boosted electricity generation, in which:

FIG. 3a is a graph showing time-resolved current variation generated from the TIDE-G during the entire droplet impact process.

FIG. 3b is a graph showing synchronization of droplet spreading dynamics and current response as well as mapping the time-dependent variation of charges flowing between PTFE/ITO and drain electrode. The droplet retracts but still keeps in contact with the drain electrode, while the current reverses to a negative value. Insets are the selected snapshots showing droplet dynamics on TIDE-G.

FIG. 3c is a graph showing time-dependent variation of the transferred charge Q generated on TIDE-G by an impinging droplet, indicating that the charge can be fully go back to zero when the TIDE-G transits to the switching-off mode. Cyclic measurements show the superior reversibility in the charge transfer. Notably, the amount of charge transferred between the source and drain in each cycle is constant, a signature that there is no additional charge supply from PTFE or water, although the charge transfer or electricity generation is gated by the soft, configurable water droplet.

FIG. 3d is a graph showing distinct contrast in the measured maximum charge $Q_{max}$ generated by an impacting droplet on TIDE-G and control sample under different We or maximum droplet spreading area, suggesting that the enhanced electricity generation is regulated by the elegant interplay between the impinging droplet and the unique configuration of the TIDE-G, rather than originating from the interfacial contact electrification.

FIGS. 4a to 4d include schematic diagrams and a graph showing working mechanism of TIDE-G, in which:

FIG. 4a is a schematic diagram showing the working mechanism of boosted electricity generation from TIDE-G. The PTFE carries sufficient charges either through continuous droplet impinging or by ion-injection and there exists an electric field ($E_1$) within it. After that, in each cycle, at the beginning of the droplet spreading (i, ii), almost no positive charges in the spreading droplet are transported to the PTFE/water interface owing to the presence of $E_1$ and hence there is no electricity generation. In contrast, when the PTFE and drain are connected by the spreading droplet (iii), the higher potential on the drain electrode over the PTFE leads to the building of an additional electric field $E_2$ within the droplet, thereby transforming the original random motion of ions into a directional flow, with positive and negative ions towards the PTFE surface and drain electrode, respectively. Meanwhile, because of the stronger EDL effect relative to the electrostatic interaction between PTFE and ITO, these positive charges initially bound by ITO can be released and flow toward the drain electrode (iv). When the water droplet starts to retract (v) until its separation with the drain electrode (vi), the charges on the drain electrode can flow back to ITO, transiting to the switching-off mode again.

FIG. 4b illustrates a MD simulation showing the distribution of charges inside the water and on the PTFE surface for the switching-off mode.

FIG. 4c illustrates a MD simulation showing the distribution of charges inside the water and on the PTFE surface for the switching-on mode.

FIG. 4d is a graph showing a comparison of the number of positive-negative charge pairs formed in EDL for the switching-on and switching-off modes, respectively.

FIGS. 5a to 5c are graphs showing the relationship between surface charge loaded by droplet impinging and the effect of PTFE film thickness; in which:

FIG. 5a shows the variation of the measured $Q_{max}$ under different thickness of PTFE film after droplet impinging of same times ($1.6 \times 10^4$), indicating that this charge loading method is insensitive to the thickness of PTFE film.

FIG. 5b shows the variation of the output voltage as a function of the number of individual droplet impinging.

FIG. 5c shows the correlation between the measured output and the measured $Q_{max}$.

FIGS. 8a to 8d include a photographic image, schematic diagrams and graphs concerning a control experiment performed based on TENG in which:

FIG. 8a is an optical image showing the as-fabricated TENG device.

FIG. 8b is a schematic drawing showing detailed working mechanism of the device.

FIG. 8c is a graph showing variation of voltage output from TENG as a result of continuous droplet impinging. Inset shows the time-dependent variation of voltage generated from a single droplet impinging.

FIG. 8d is a graph showing, for each test, the amount of transferred charges in TENG (upper curve) is measured to be identical with the charges carried by the departing droplets (lower curve), confirming that the electricity generation from the TENG indeed originates from the contact electrification effect.

FIGS. 14a to 14b are circuit diagrams showing equivalent circuits for the switching-off mode and switching-on mode, respectively; in which:

FIG. 14a is the graph showing, prior to the contact of the impinging droplet with the drain electrode, there is no capacitor formed at the water/drain interface. As a result, $C_P$ and $C_1$ stay in an open-circuit and there is no charge flow between them.

FIG. 14b shows that, In contrast, with the connection of the drain electrode and PTFE rendered by the gating liquid (switching-on mode), the other capacitor $C_2$ is established at the water/drain interface, forming a closed-circuit together with $C_P$ and $C_1$.

DETAILED DESCRIPTION OF PREFERRED EMBODIMENTS OF THE INVENTION

Water energy is one of the most abundant, affordable and sustainable sources on earth. As the demand for sustainable and renewable energy is ever increasing, the pursuit of new strategies to achieve efficient electricity generation from green and recyclable sources such as raindrops has received increasing attention. In spite of extensive progress, efficiently harvesting the hydrodynamic energy of droplets remains challenging. For example, to date, the output power density of liquid/solid based triboelectric nano-generator (TENG) is less than 1 W/m² owing to the limitation imposed by the interfacial effect, as characterized by the charge generation and transfer occurring at the solid/liquid or liquid/liquid interfaces. Thus, the present invention timely to provide new approaches that fundamentally overcome the limitation of the interfacial effect.

The present invention is concerned with a "transistor-like" impinging droplet electricity generator, hereinafter also referred as TIDE-G, in which ITO electrode, Al electrode and water droplet serve as the source, drain, and gate, respectively. Polytetrafluoroethylene (PTFE), which has been identified to use as an electret material with high negative charge storage capability and robust stability that can be preserved through continuous droplet impinging, is designed on the top of ITO source to function as a virtual source. The PTFE enables the electrostatic induction of positive charges on ITO. Experiment leading to the present invention have demonstrated that the spreading of the soft, configurable droplet bridges the originally disconnected components in the device into a closed, electrical system, transforming the conventional solid/liquid interfacial effect into a desirable bulk effect. Such a unique design allows for the reversible and efficient transfer of charges between the source/virtual source and drain, resulting in the enhancement of power density by several orders of magnitude as opposed to its counterparts imposed by the interfacial effect. The present invention is applicable in a variety of systems or applications, and can represent a paradigm-shift in the design of advanced devices for efficient energy harvesting.

Figures 1A, 1B, 1C:
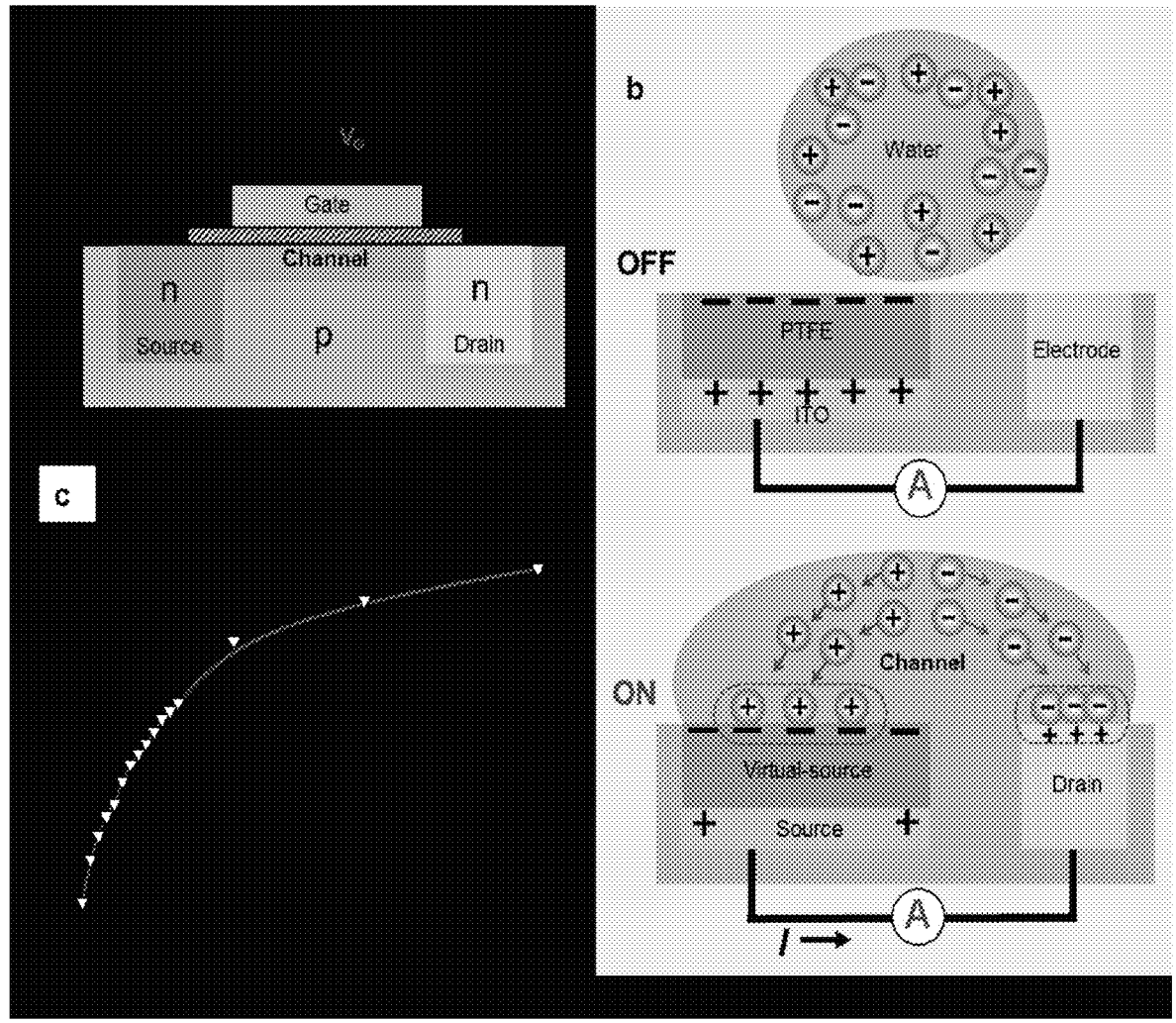

The present invention relates two aspects combined together. A first aspect is concerned with the building block of modern electronics, field effect transistor, consisting of four major components, i.e., the gate, source, drain and substrate, respectively, which can dynamically gate the transport of carriers between the source and the drain when an external voltage is applied in gate. Please see FIG. 1a. FIG. 1b shows the schematic drawing of our transistor-like electricity generator, termed as TIDE-G, in which the source is made of a transparent ITO and the drain consists of an Al electrode.

A second aspect is concerned with behavior of continuous droplet impinging serving as a facile method to induce high charge density on PTFE. PTEE has been found to be a promising electret material with high charge storage capability and stability. As shown in FIG. 1c and FIG. 1, there is a gradual increase in the surface charge with the progression in the times of droplet impinging. Experiments leading to the present invention have shown that the PTFE surface can serve as a rich charge reservoir to electrostatically induce opposite charges of the same amount on ITO and ensure a continuous and reversible charge transfer. Since PTFE electret is associated with high charge storage density whose stability can be also preserved by continuous droplet impinging, it serves as a virtual source. When a falling droplet spreads on the PTFE surface, it induces the charge transfer between the ITO source and drain, bridging the originally disconnected terminals into a closed-system, a process reminiscence of the formation of gate channel under the action of gate voltage in the case of FET. The dynamic formation of the gate-like channel in our TIDE-G is also accompanied by the concurrent building of electrical double layers (EDLs) at both terminals that ultimately leads to the preferential charge separation and the directional transport of ions to the respective terminals. From the energy point of view, continuous impinging droplets also serve as soft, configurable transformers that dynamically regulate the efficient hydrodynamic-to-electrical energy conversion. Thus, by careful control of the synergistic cooperation among the source/virtual source, drain and gate, it has been shown that continuous and efficient electricity generation is achievable by translating the conventional interfacial effect into a desirable bulk effect from the sustainable source, such as raindrop, in an on-demand manner.

Figures 2A, 2B, 2C:
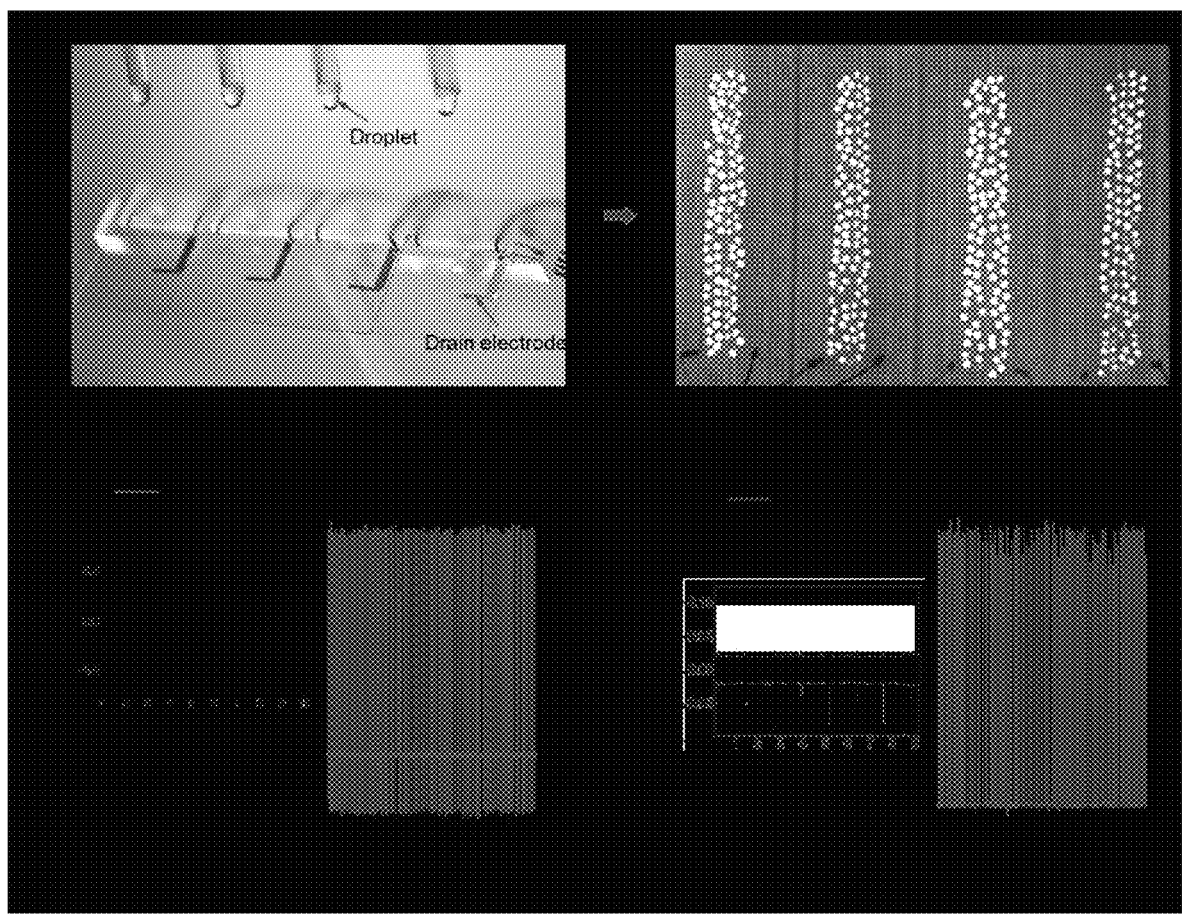
Figure 6:
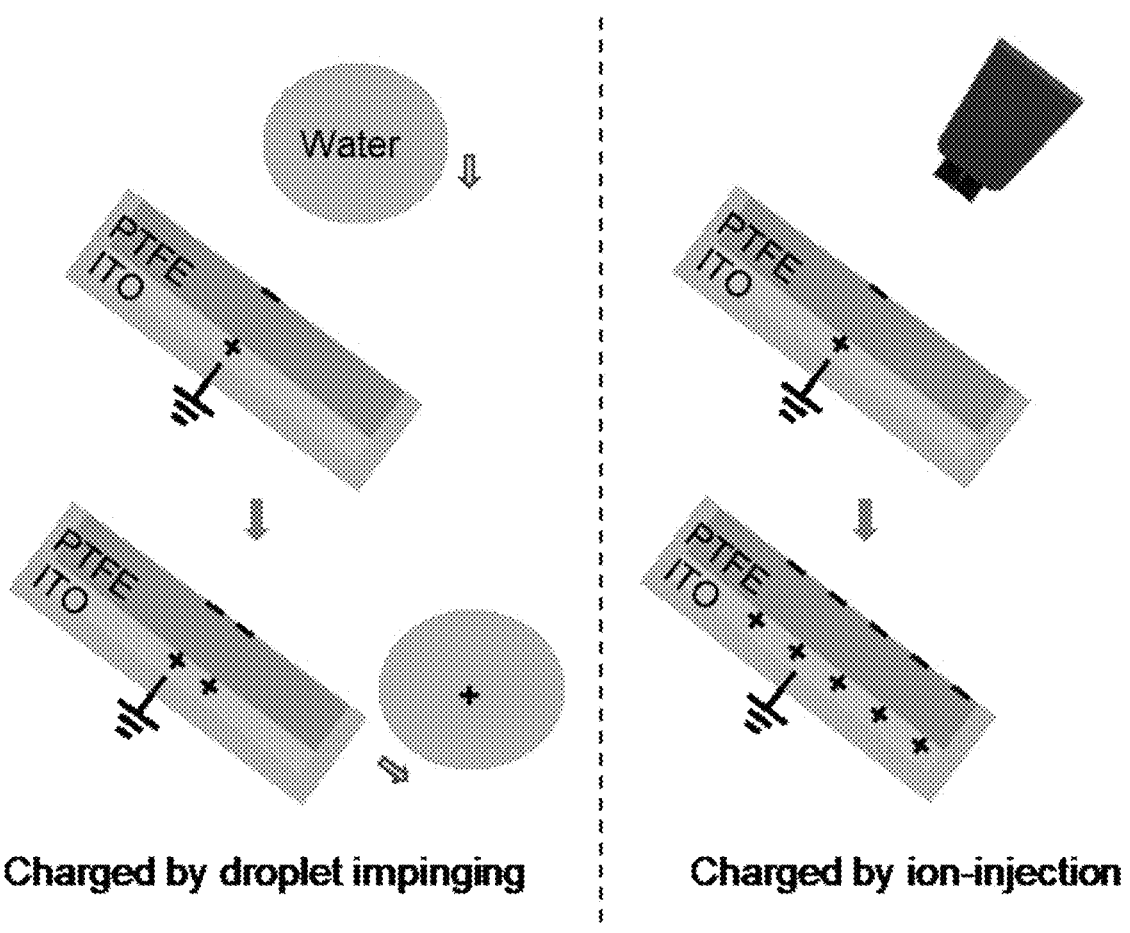
FIG. 6 is a schematic diagram showing the preservation of high charge storage and stability on PTFE through droplet impinging or ion-injection, respectively. PTFE is a promising electret material with high negative charge storage capability and robust stability. Such superior performances can be preserved through continuous droplet impinging (left) or ion-injection (right). The charge loaded by droplet impinging is from the contact electrification between the PTFE and water. Moreover, the negative charges on the PFFE film can be also be enhanced by the ion-injection, which is conducted by utilizing a commercial antistatic gun (Zerostat3, Milty) to inject various ions including $CO_3^-$, $NO_3^-$, $NO_2^-$, $O_3^-$, and $O_2^-$ from a vertical distance of ~5 cm$^5$.
Figure 7:
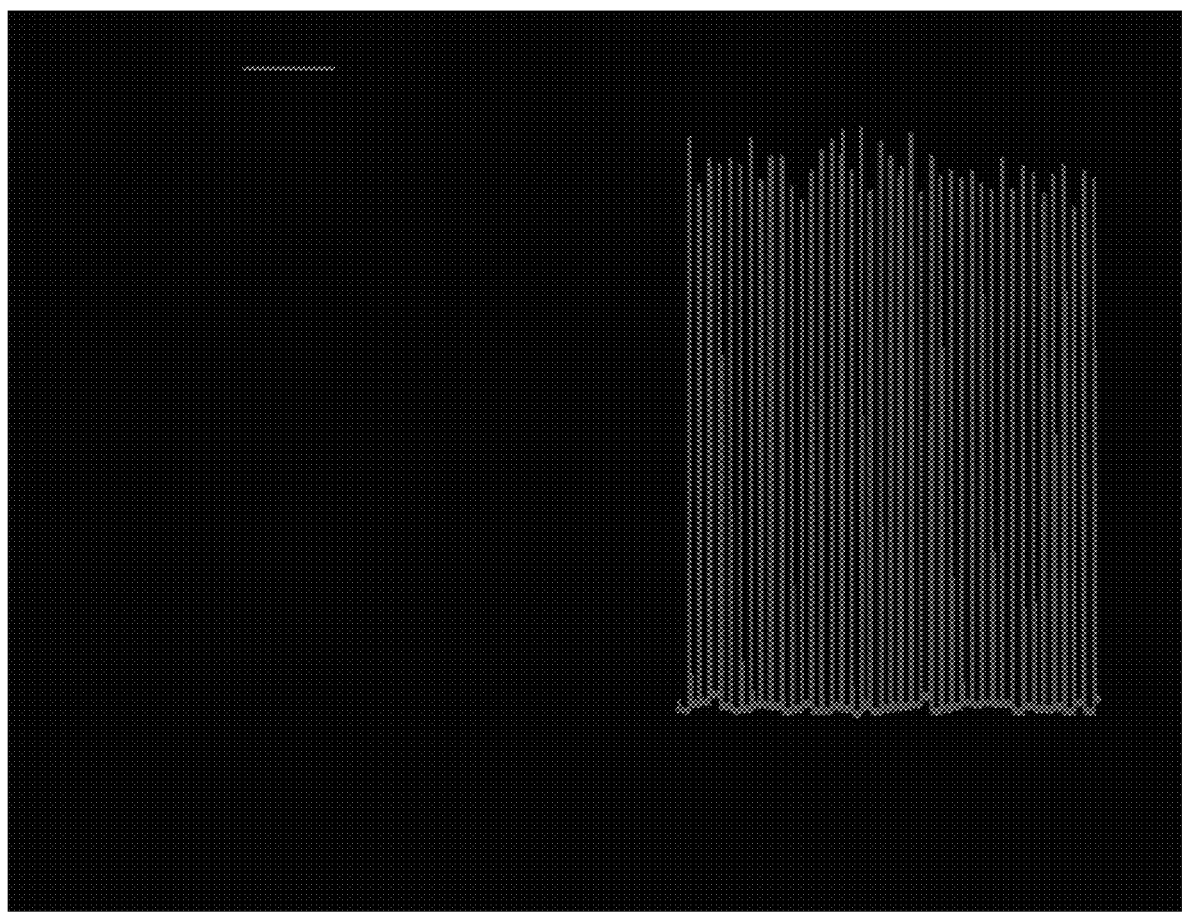
FIG. 7 is a graph showing a comparison of measured charge from TIDE-G and the control device in response to continuous impinging of individual droplets. The output charge measured from TIDE-G (in red) is ~59 nC, which is ~760 folds higher than that of the TENG device (please see right portion of the figure).
Figure 9:
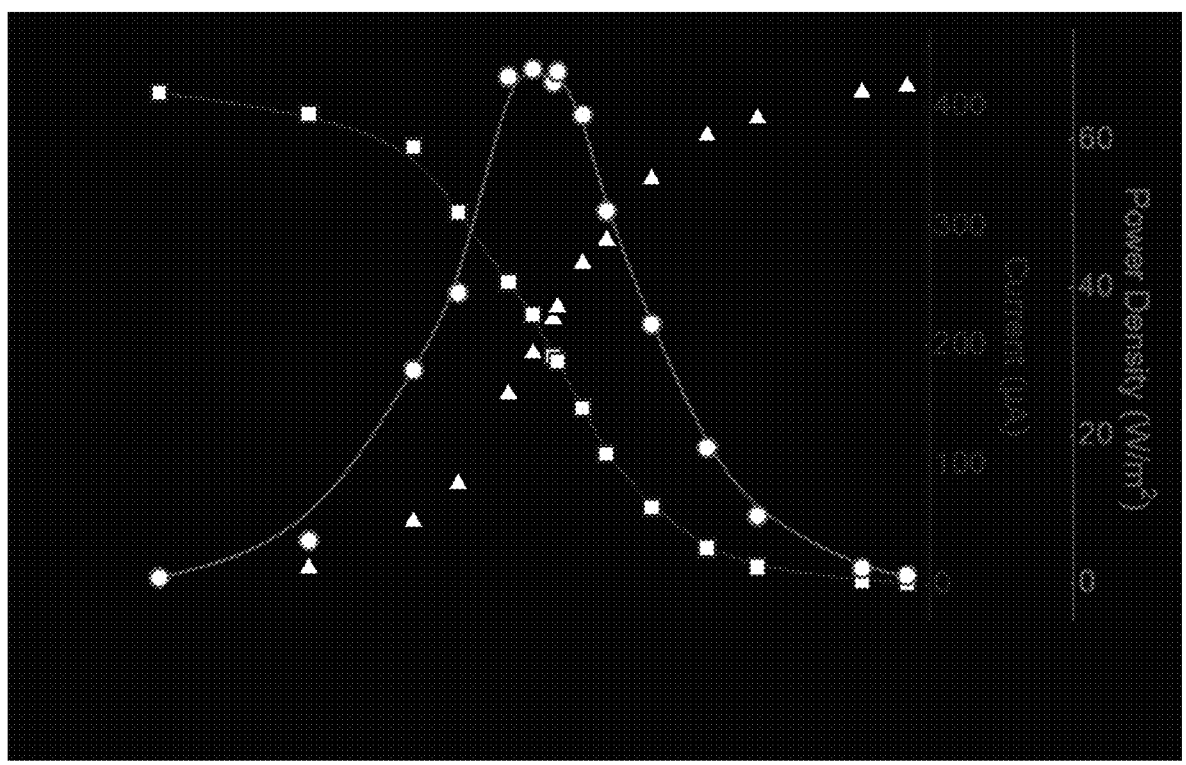
FIG. 9 is a graph showing electrical outputs of TIDE-G as a function of load resistance. With the load resistance increase from 1 KO to 100 MO, the output voltage was measured to vary from 0.45 V to 170 V and the output current decreased from 410 µA to 1.55 µA. When a load resistance was 33.2 KO, the maximum output power-density was 69.8 W/m$^2$.
Figure 10:
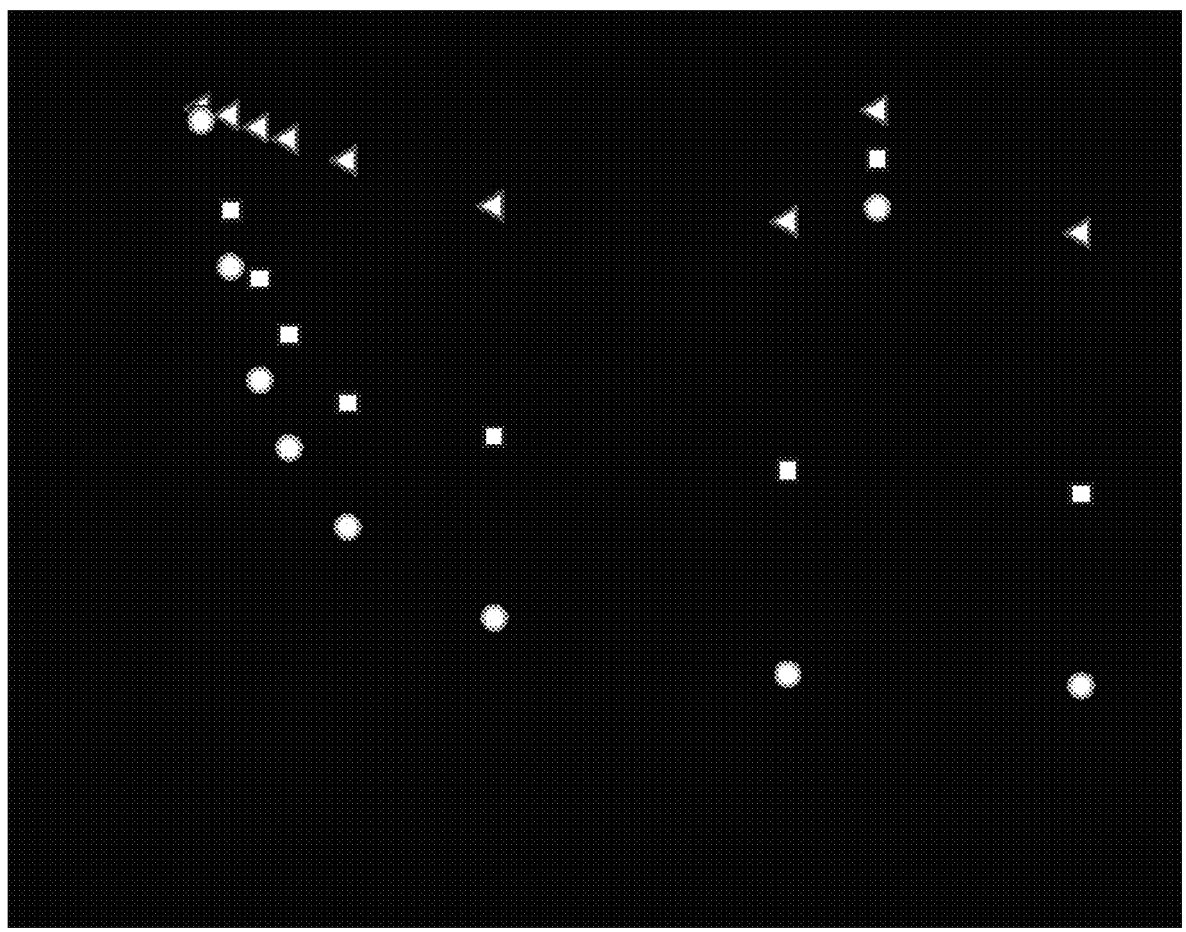
FIG. 10 is a graph showing stability of the charges on PTFE under various humidity; in which when kept under a humidity of 40 RH % for 30 days, the charges on PTFE are still quite stable and there is no pronounced decay. With the increase in the humidity, there is a relatively large deterioration in the amount of measured charges.
Figure 11:
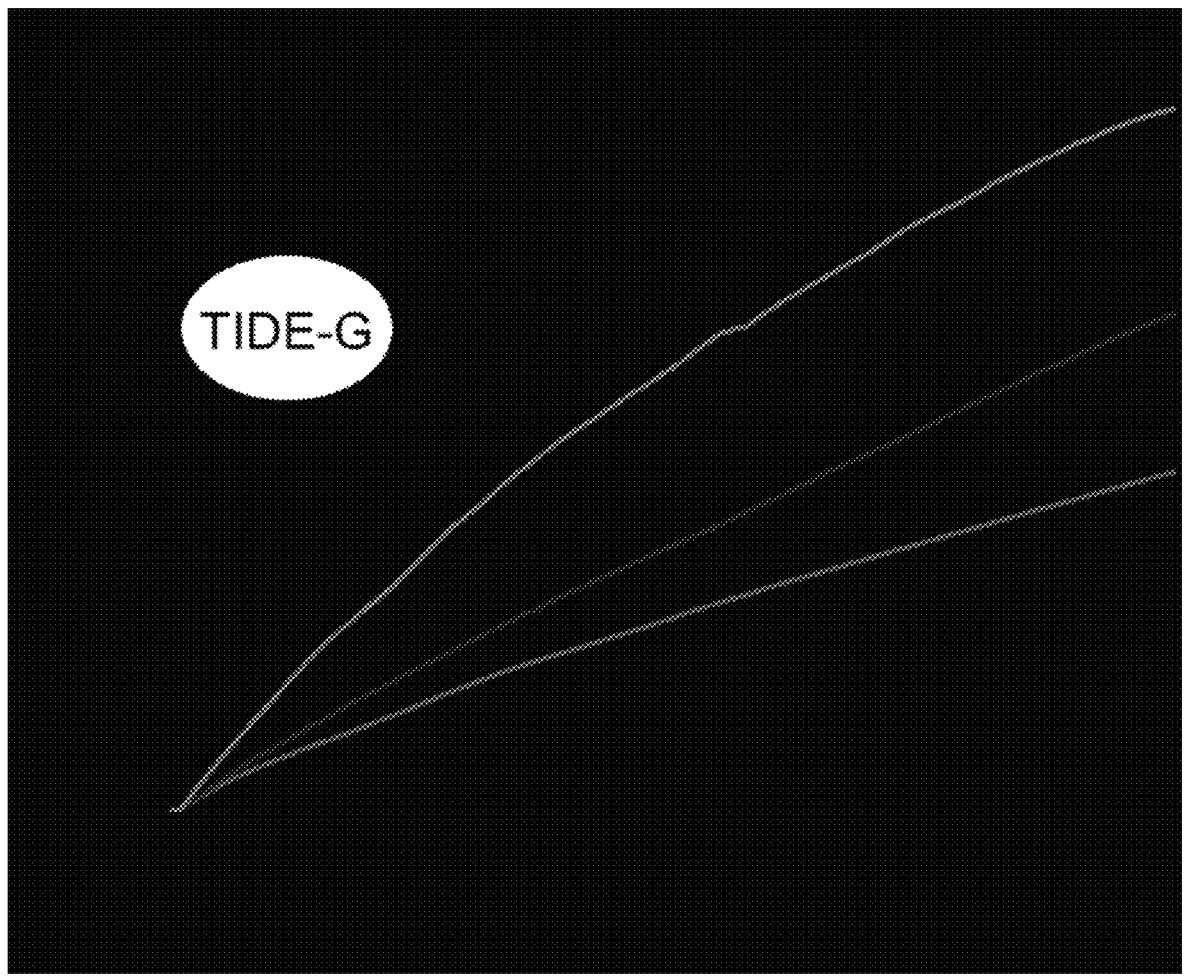
FIG. 11 is a graph showing a capacitor charged by a TIDE-G. The capacitor has a 10 μF in a typical full-wave rectifier (Inset) can be charged to 3 V, 7.5 V, 11 V, 15.4 V under continuous water droplet impinging with a frequency of 3 Hz, 8 Hz, 15 Hz, and 30 Hz, respectively. These result shows that the electricity energy generated from TIED-G can be enhanced by increasing the frequency of droplet impinging.

FIG. 2a shows the optical image of the as-fabricated transparent TIDE-G with four individual units connected in parallel. Each device was constructed by the coating of PTFE film with a thickness of 13.4 μm on ITO glass substrate with a size of 30×30 mm$^2$ using drop-casting method, and then the glass slide was heated at 120° C. for 15 mins to remove all solvent. The tiny Al electrode was assembled onto the PTFE to form a drain electrode. Intriguing and unexpected results can be obtained when individual droplets impinge on the surfaces of as-fabricated devices, on which PTFE surfaces have been loaded with sufficient charges, either by continuous droplet impinging or ion-injection. Please also see FIG. 6. As shown in FIG. 2a, four droplets, released from a height of 15 cm and with a volume of 100 μL, can light up 400 commercial LEDs. Focusing on an individual TIDE-G indicates that the open circuit output voltage, short circuit current and charge are measured at 170 V, 410 μA and 59 nC, respectively. Please see FIGS. 2b, 2c and FIG. 7. Accordingly, the improvements are ~350, ~4000 and ~760 folds, respectively, higher than those without the use of transistor-like design, i.e., the control device based on TENG. Please see FIGS. 8a to 8b. To further verify the improvement and the maximum power output, the output characteristics under various load resistances were also measured. With the load resistance increasing from 1 KO to 100 MO, the output voltage varies from 0.45 V to 170 V and the output current decreases from 410 μA to 1.55 μA. The maximum power density is 69.8 W/m$^2$ when the load resistance is 33.2 KO. Please see FIG. 9. The power density is three orders of magnitude higher than that of its counterparts. Referring to FIG. 10, when being kept under a humidity of 40 RH % for 30 days, the device exhibits no notable decay in the output, with measured charge stabilized at ~49 nC. Further tests were conducted to verify the practical application of TIDE-G in that a 10 μF capacitor was charged through a typical full-wave rectifier under continuous drop impinging. Within a period of 170 s, the capacitor can be charged to 3.1 V. Please see FIG. 11. Moreover, the charging rate can be further enhanced by increasing the droplet impinging frequency.

Figures 3A, 3B, 3C, 3D:
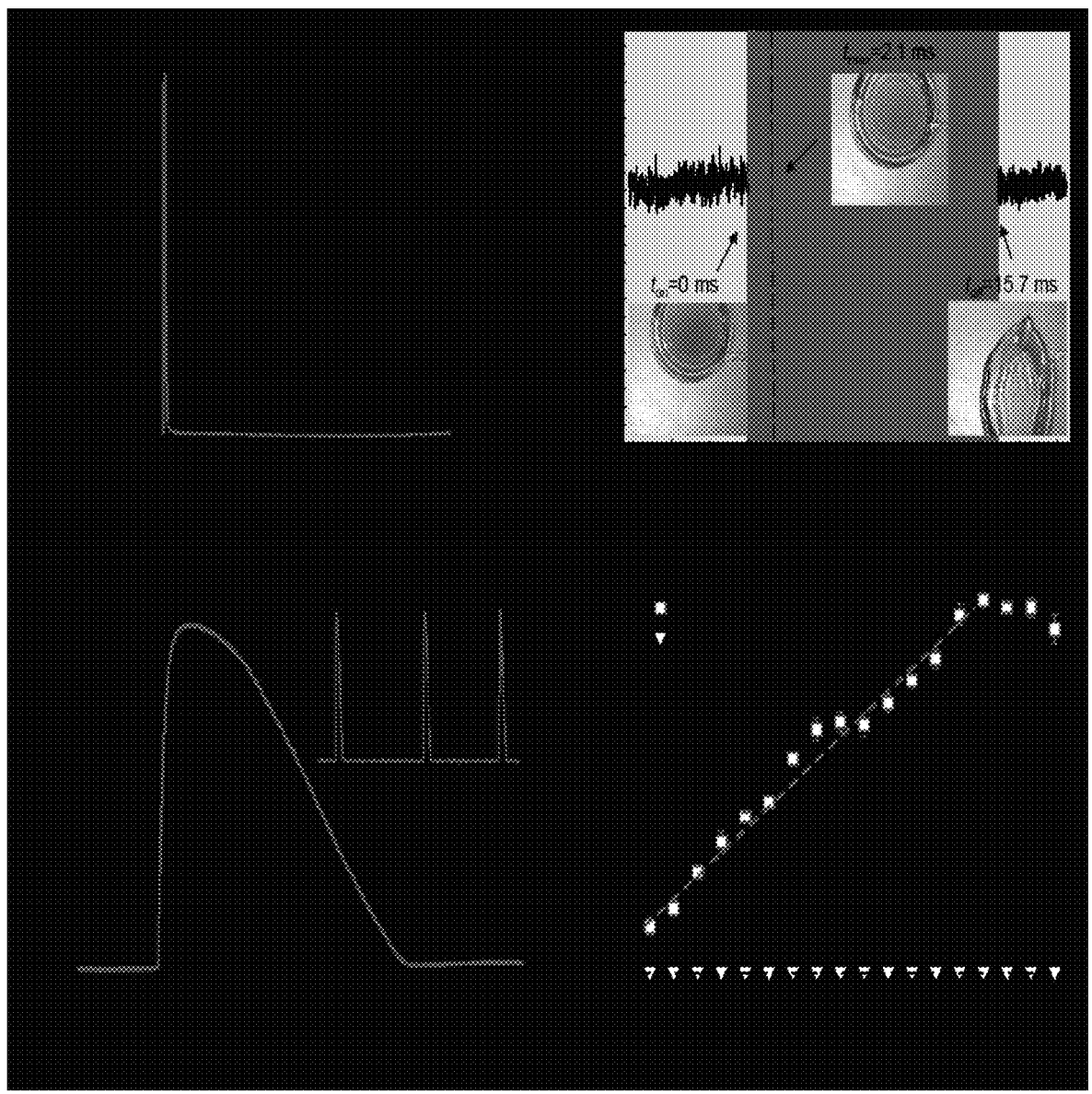

From the above, the attainment of the boosted power density as well as the integration of almost all the superior performances in our design according to the present invention indicates that the TIDE-G is empowered by a unique working mechanism. In order to demonstrate the mechanism, a graph of time-dependent evolution of the measured current was plotted. Please see FIGS. 3a and 3b. Upon its contact with the PTFE, there is no apparent current output from the spreading droplet, exhibiting a switching-off state. Such a process is essentially the conventional contact electrification in which the charge generation is limited by an interfacial effect. Then the current exhibits a large acceleration with a pronounced peak up to 410.1 μA at $t_{on}$=0 ms, transiting into a switching-on state. More interesting characterization can be obtained by careful synchronization of droplet spreading dynamics and current response as well as mapping the time-dependent variation of charges flowing between PTFE/ITO and drain electrode with the current-time curve. Further inspection also shows that the sharp increase in the current originates from the contact of the spreading droplet with the drain electrode. Such a sudden jump in current is reminiscence of the directional and rapid transfer of positive charges from the ITO electrode to the drain terminal, which is validated by our experimental measurement. Please see FIG. 3c. As shown, there is a rapid increase in the measured charges which is concurrent with the pattern observed on the current flow. With the progression of droplet spreading, positive charges transfer sustains until reaching another critical time point $t_{max}$=2.1 ms, which is associated with a maximum spreading area $A_{max}$=2.72 cm$^2$ (FIG. 3b), a zero current and a maximum $Q_{max}$=59.3 nC (FIG. 3c). Interestingly, with the retraction and sliding of the droplet, the positive current turns to negative, accompanied by a gradual drop in charges, indicating the occurrence of the back flow of positive charges from the drain electrode to ITO. When the droplet fully detaches from the drain electrode at $t_{off}$=15.7 ms, both the current and measured charge drop to zero, reversing to the switching-off state again. In this condition, all the charges are restored back to source, making it possible to restart a new cycle. As shown in FIG. 3c, such a reversibility is further confirmed by the cyclic charge measurement. Notably, the amount of charge transferred between the source and drain in each cycle is constant, suggesting that there is no additional charge supply from PTFE or water in this process, although the charge transfer or electricity generation is gated by the soft, configurable water droplet.

Figure 12:
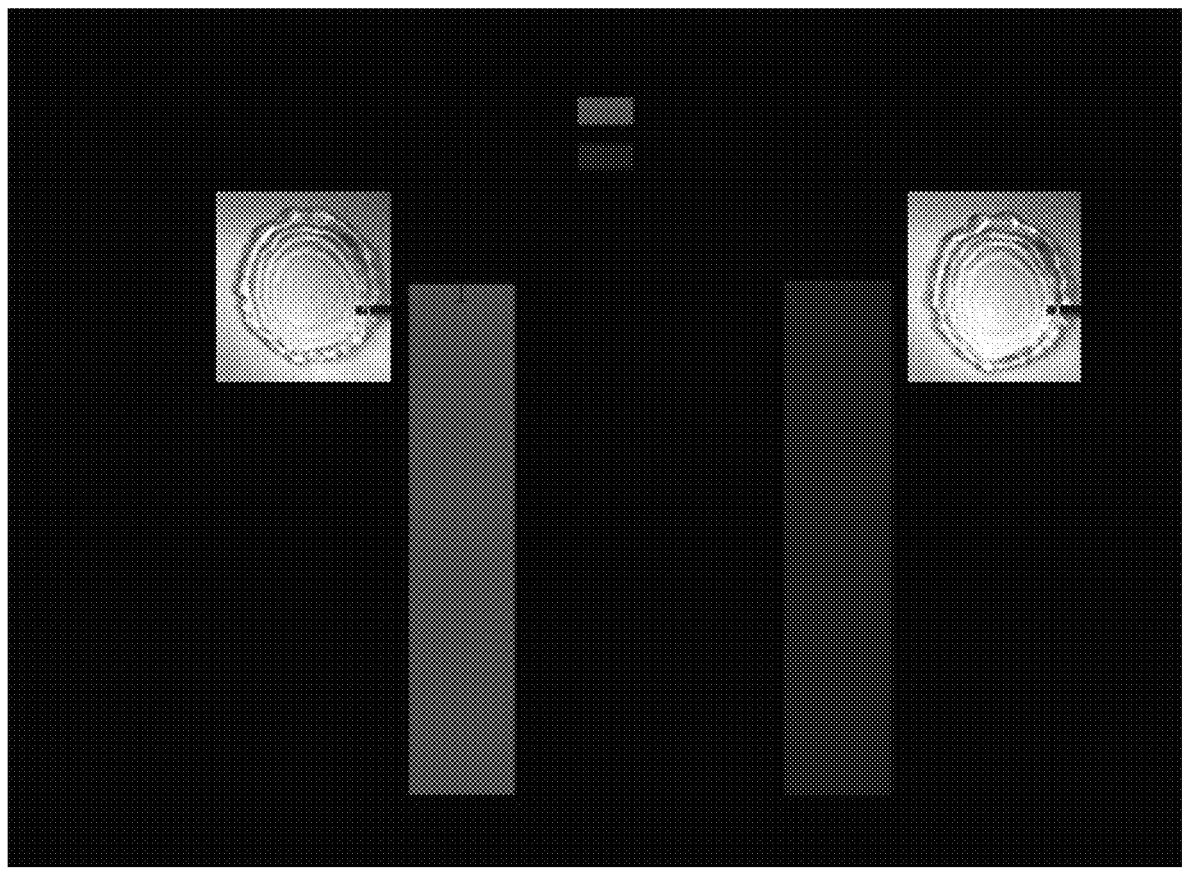
FIG. 12 is a graph showing comparison of the maximum spreading area $A_{max}$ on the PTFE surface loaded with or without sufficient charges, respectively.

To further underpin the reason responsible for the spectacular performances of our TIDE-G, the variation of measured maximum charges $Q_{max}$ transferred from the source to drain as a function of the Weber number was measured. Please see FIG. 12, wherein We=$\rho Dv^2/\gamma$, where D, v and $\gamma$ are the diameter, impact velocity and surface tension of the droplet, respectively. As shown in FIG. 3d, the charge is linearly proportional to We: as the We increases from 27.6 to 130.9 by varying the releasing height, the transferred charges increase from 21.9 nC to 68 nC. In contrast, without the use of a transistor-like design, the measured charges on TENG are negligible and insensitive to We or the maximum spreading area, $A_{max}$~We. Also, there is no notable difference in the charges measured from the droplets departing from TIDE-G and TENG. Please see FIG. 11. Thus, the fidelity of the amount of transferred charges between the source and drain in response to varying We suggests that the electricity generation is exquisitely regulated by the interaction between the impinging droplet and the unique configuration of the TIDE-G, rather than originating from the interfacial contact electrification.

Figures 4A, 4B, 4C, 4D:
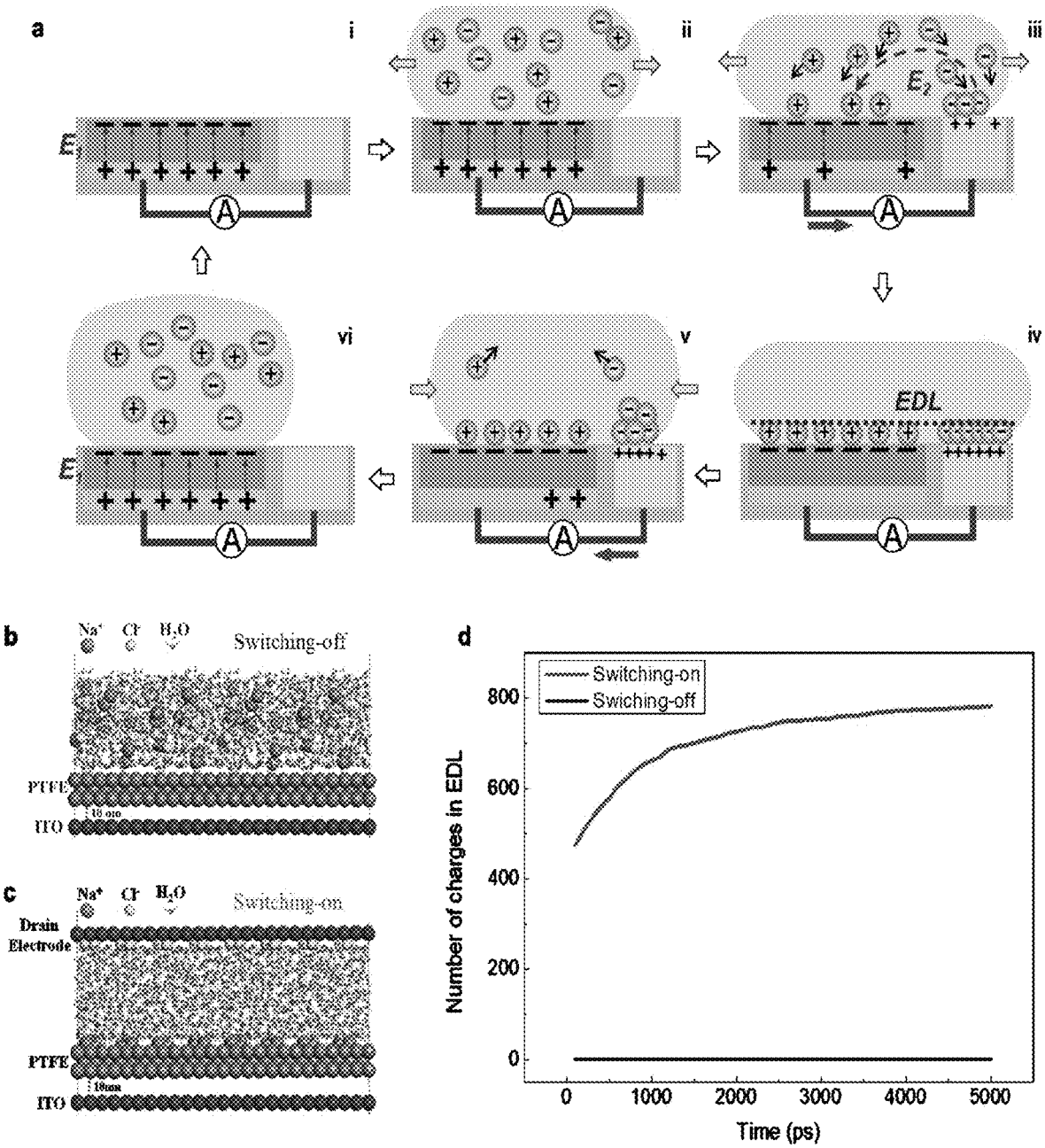

The behavior of the efficient and continuous electricity generation from the transistor-like design is discussed here. Given a maximum water/PTFE contact area $A_{max}$ of 2.72 cm$^2$ and measured charge $Q_{max}$ of 59.3 nC, the voltage established across the PTFE is calculated ~170.9 V, which is consistent with our experimental measurement. This suggests the unique roles of the virtual source and the source, which provide ample charges for electricity generation. To further elucidate the reason for the reversible charges release, the detailed charges transfer process was studied. Prior to the contact of the impinging droplet with the drain, i.e., in the switching-off mode, there is no EDL formed at the water/drain interface (FIG. 4a). While the PTFE carries sufficient negative charges, the electric field $E_1$ established inside PTFE prevents the directional flow of positive charges in bulk water toward the PTFE surface, thereby suppressing the formation of an effective EDL at the liquid/PTFE interface (i, ii). In contrast, when the PTFE and drain are connected by the spreading droplet (iii), the presence of higher potential on the drain over the PTFE leads to the building of an additional electric field $E_2$ within the droplet, thereby transforming the original random motion of ions into a directional flow, with positive and negative ions towards the PTFE surface and drain electrode, respectively. Meanwhile, because the EDL effects at the water/PTFE and water/drain interfaces are stronger than the electrostatic interaction between PTFE and ITO, these positive charges initially inducted on ITO can be released and flow toward the drain electrode (iv-vi). Taken together, these results paint a vivid picture that the PTFE, ITO and spreading droplet indeed serve as the virtual source, source, and gate channel, respectively, all of which seamlessly work together to allow the reversible and efficient charge transfer for the boosted electricity generation.

The preferential formation of EDL in the switching-on mode is also substantiated by the molecule dynamic (MD) simulation. As depicted in FIG. 4b, in the case of switching-off state, negative and positive ions are randomly distributed in the bulk water layer and the amount of EDL formed at the water/PFFE is insignificant. In contrast, when the TIDE-G is in the switching-on mode, there is a preferential separation in the positive and negative charges, thus avoiding the screening effect dominated in the switching-off state FIG. 4c. In this condition, the number of positive-negative charges at the water/PTFE interface is two orders of magnitude larger than its counterpart (FIG. 4d).

The entire system from a simple energy perspective was also analyzed. In the switching-on mode, the gate-like droplet serves as a resistor, and the PTFE can be considered as a capacitor $C_P$, in which the water/PTFE serves as the top plate and PTFE/ITO as the bottom plate, respectively. The voltage across the capacitor is written as $d\sigma_P/\varepsilon_P$, where $\sigma_P$, $\varepsilon_P$ and d are the charge density, dielectric constant and thickness of PTFE, respectively. Two additional capacitors are also established at the water/PTFE interface and the water/drain interface, respectively, thus forming a closed-circuit. Please see FIGS. 14a to 14d. Since the capacitance of the capacitor $C_P$ is three orders of magnitude smaller than of the two capacitors at water/PTFE and water/drain interface, almost all these positive charges stored on the bottom plate of $C_P$ can be transferred to the other two capacitors in the switching-on mode. Also, upon the end of the charging process, the $C_P$ can be recharged by the other two capacitors. Thus, the reversible and efficient charge transfer between ITO and drain provides a pathway for the conversion of the hydrodynamic energy stored in the configurable, gate-like droplet. Indeed, as discussed in FIG. 3d, for the impinging droplet with a larger We, more electricity generation is achieved as a result of the presence of larger spreading area for charge transfer. Notably, during the entire process, the virtual source (PTFE electret) preserves a constant charge density owing to its high charge stability, as confirmed by the reversible charge measurement discussed in FIG. 3c. Still, the hydrodynamic-to-electrical energy conversion can be improved by the control of higher charge density of the PTFE electret.

Figure 15:
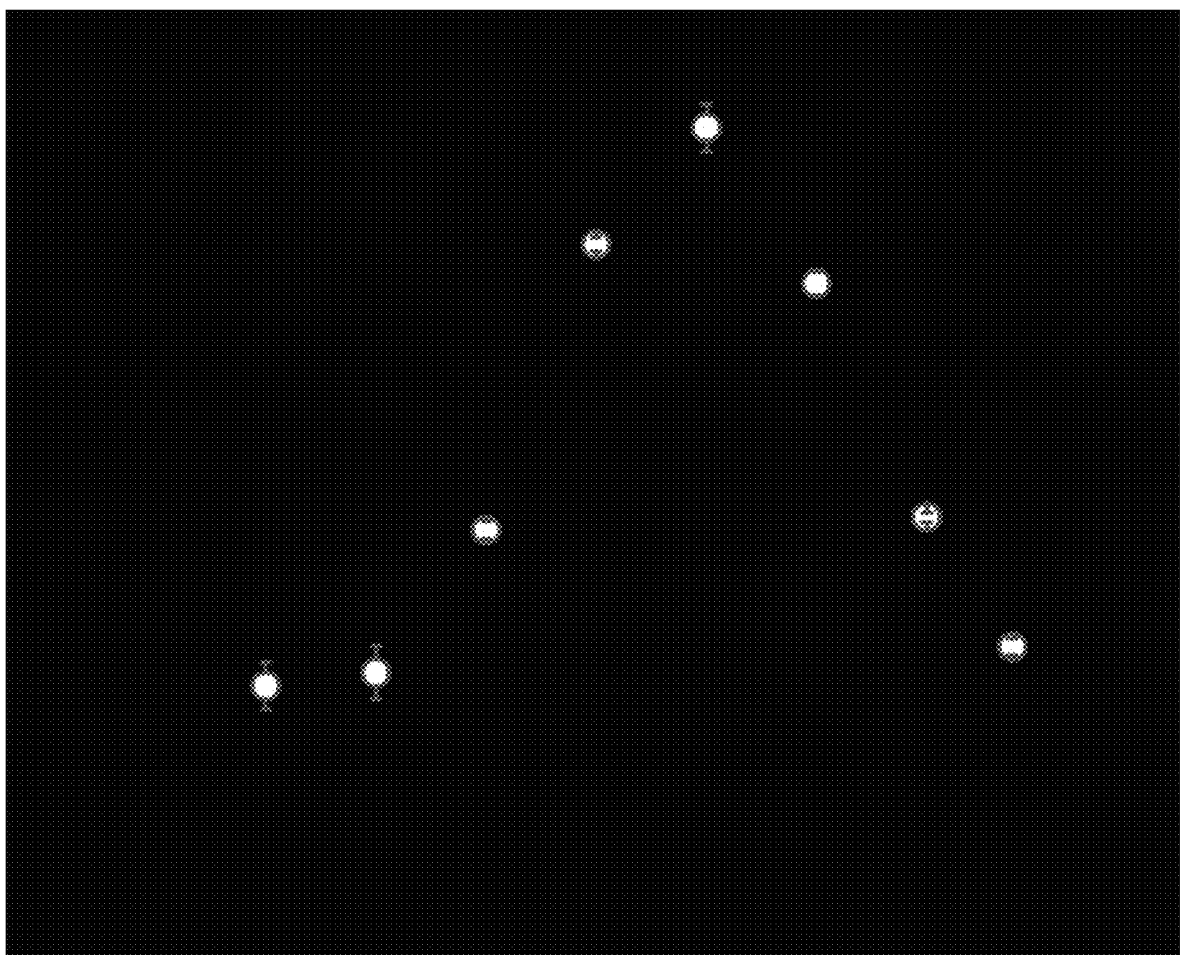
FIG. 15 is a graph showing output voltages as a function of droplet salt concentrations. The measured maximum voltage up to ~170 V appears when the ion concentration is increased to $10^{-3}$ mol/L, beyond which the output voltage decays, probably due to the inability to form the EDL again at such high concentration.
Figure 16:
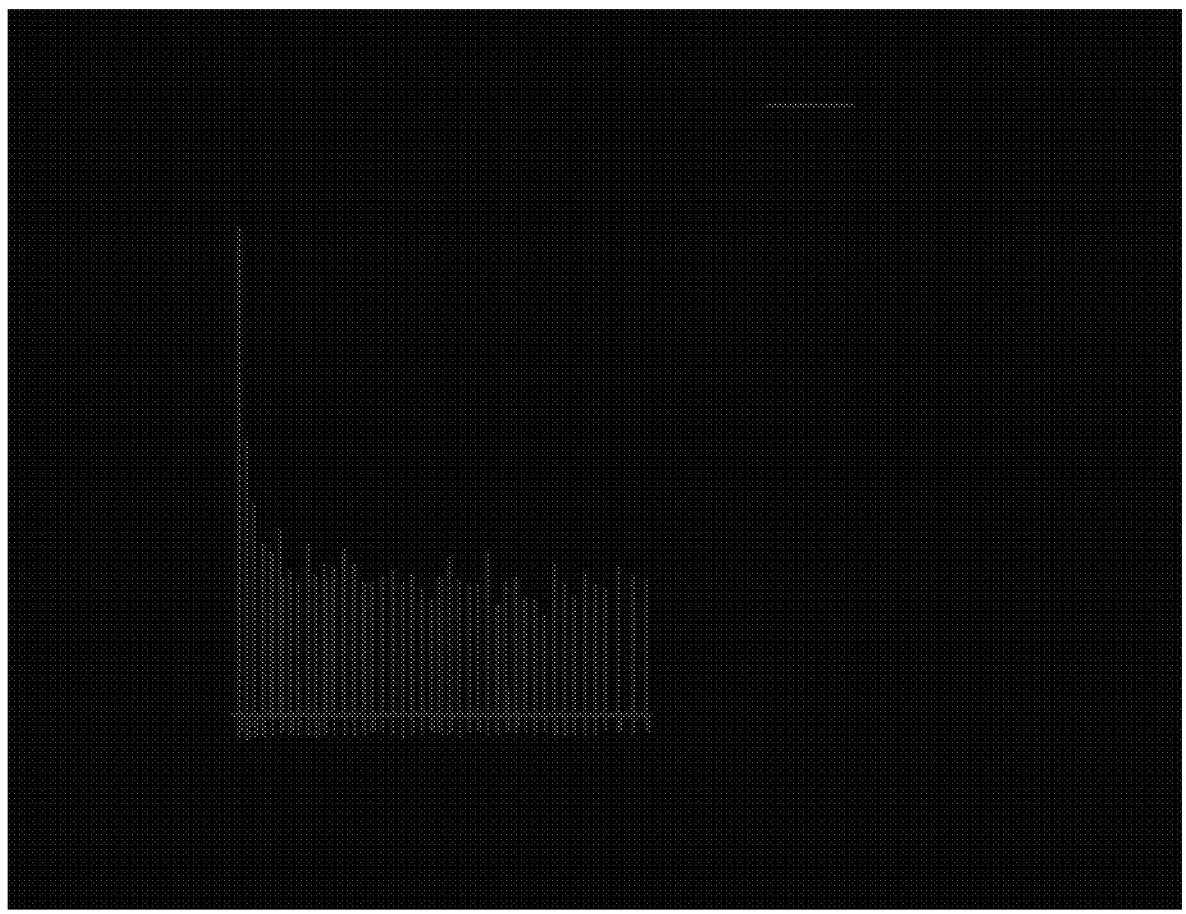
FIG. 16 is a graph showing output voltages generated from TIDE-G made of PP (left portion of graph) and PDMS (right portion of graph). Under similar surface charges, the TIDE-G devices made of PDMS and PP exhibit comparable initial output to that of TIDE-G made of PTFE. However, distinct from the latter, the output in both devices made of PP and PDMS exhibits a rapid decay, partly due to the relatively poor charge stability.
Figure 17:
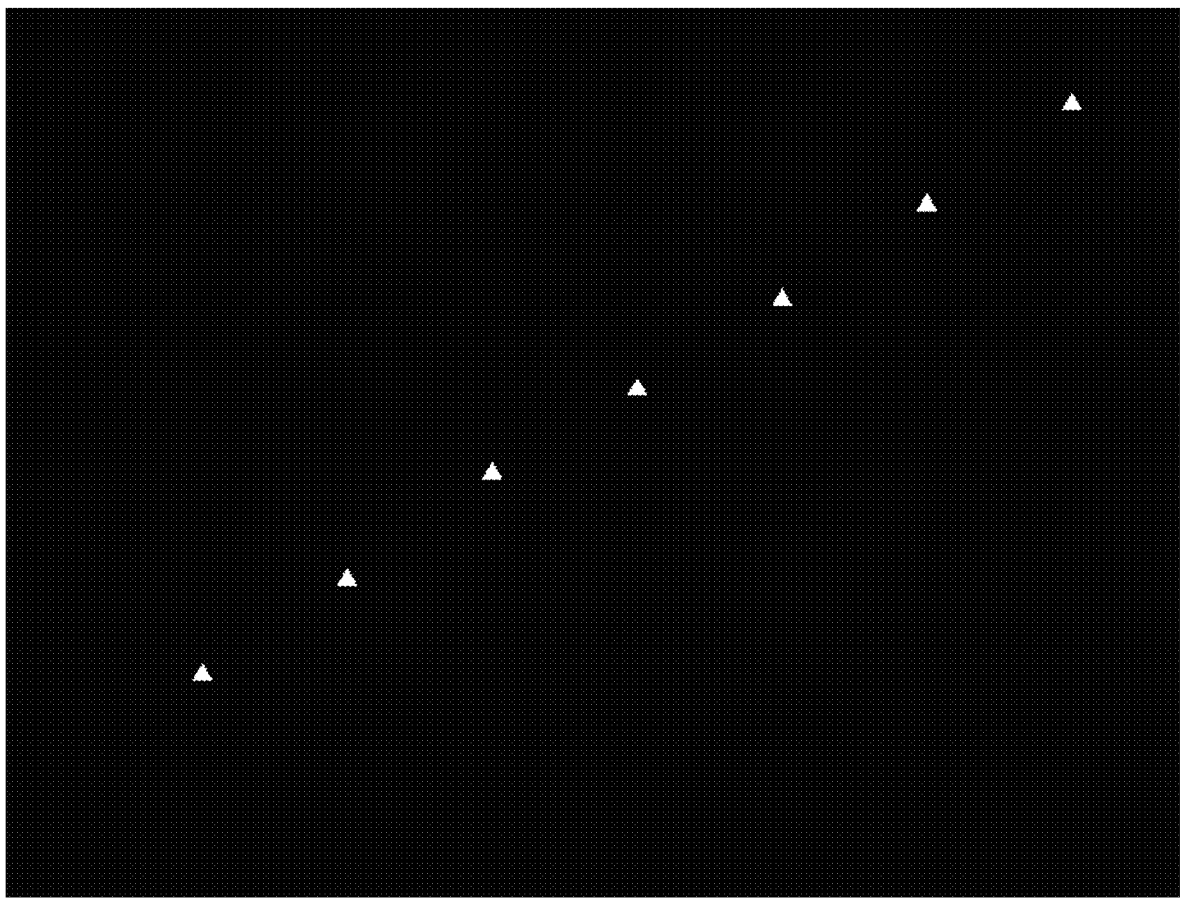
FIG. 17 is a graph showing thickness of PTFE film as a function of volume of PTFE precursor. The thickness of PTFE film linearly increases from 6.7 μm to 16.9 μm with the volume of PTFE precursor increases from 100 μL to 250 μL.
Figure 18:
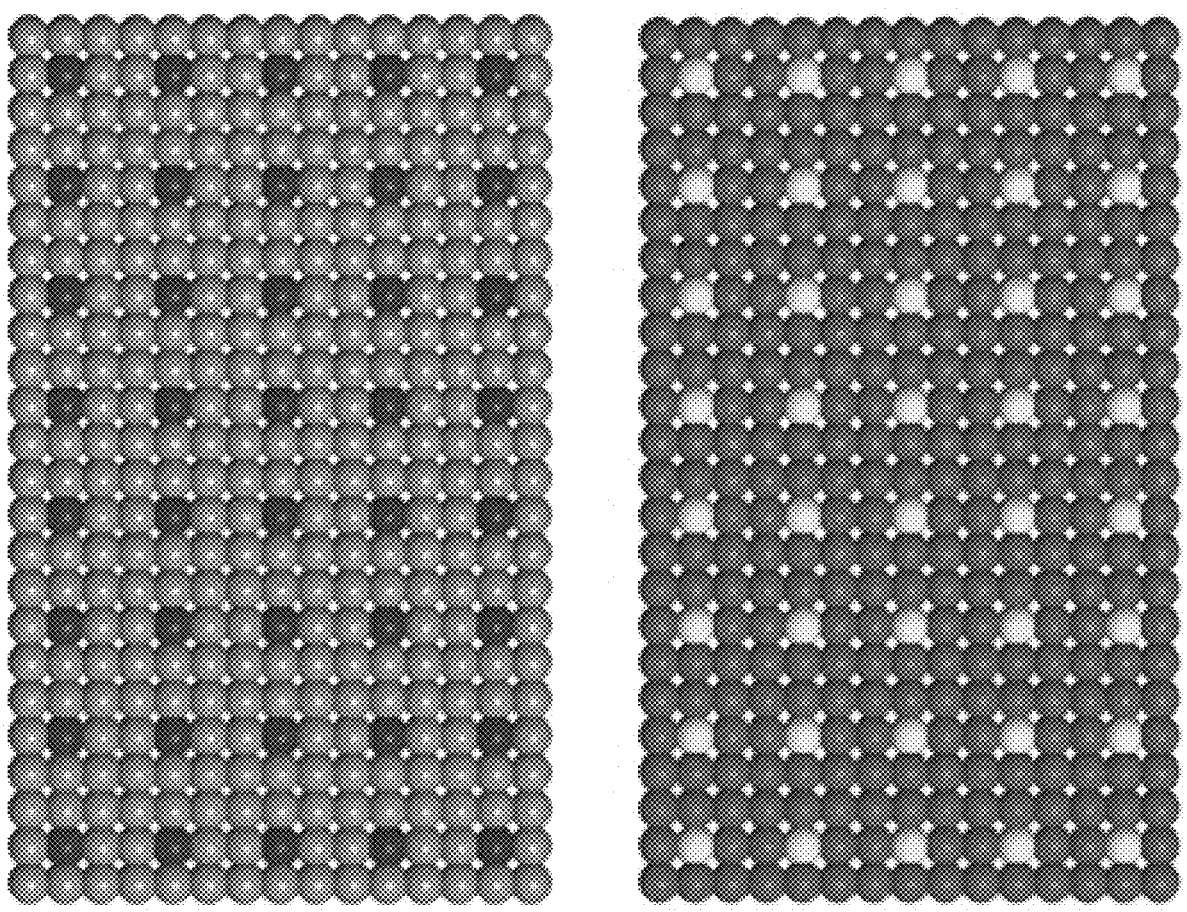
FIG. 18 is a schematic diagram showing negative and positive charges fixed on the atomic layers of PTFE and the ITO electrode, respectively.

Our transistor-like design is also generic to water with different ion concentrations. To demonstrate the generality of our generator, we then measured the electricity generation under different aqueous solutions. At low ion concentration of $10^{-7}$ mol/L (pure DI water), the electricity generation is negligible owing to the shortage of sufficient ions for the formation of EDLs at both the source/water and drain/water interfaces simultaneously. The maximum peak voltage up to ~170 V appears when the ion concentration is increased to $10^{-3}$ mol/L, beyond which the output voltage decays. This is because, at high concentrations, ions in the bulk water might screen the EDL, which prevents their directional flow to the virtual source or drain surfaces. Please see FIG. 15. Embodiments made of PTFE in accordance with the present invention also exhibits relatively good stability owing to the strong charge and wetting stability of PTFE. Please see FIG. 10. Such a charge stability is also strengthened by the continuous droplet impinging, which can provide charges to PTFE and thus preserve superior stability. Thus, in coupled with serving as the energy source and the gate-like channel as discussed above, the water droplet manifests triple functions. For control devices made of Polydimethylsiloxane (PDMS) and Polypropylene (PP) as the virtual source, the performances decay rapidly due to the poor charge stability on these surfaces, although their initial power outputs are comparable with that on the TIDE-G made of PTFE. Please see FIG. 16.

Fundamentally, the electricity generation of our devices according to the present invention is governed by the bulk effect rather than the interfacial effect. The cooperation between the virtual source, source, drain and the configurable gating droplet allows a reversible, efficient and sustainable conversion of the hydrodynamic energy, which is usually not utilized for power generation. The configurable and soft nature of the impinging water droplets ensures a high liquid/solid contact area, promoting the effective charge transfer, which is also in striking contrast to solid/solid contact electrification which suffers from limited point contact. In addition to advantages such as enhanced performances, optical transparency and cost-effectiveness, the transistor-like design can also be constructed on flexible substrates. This design principle represents a potentially paradigm-shift solution to solving inherent power-density limitation imposed by the interfacial effect, and could open new pathways for the efficient harvesting abundant hydrodynamic energy in the form of tide, wave, or falling droplets.

The following provides more description of the experiments leading to the present invention.

Methods

Materials. Acetone (RCI Labscan, 99.5%), ethanol (Sigma Aldrich, 97%), nitric acid (Sigma Aldrich, 70%), Polytetrafluoroethylene precursor (Dupont AF 601S2, 6 wt %), polydimethylsiloxane (Dow Corning® SYLGARD, PDMS 184) were used without further purification.

Figure 13:
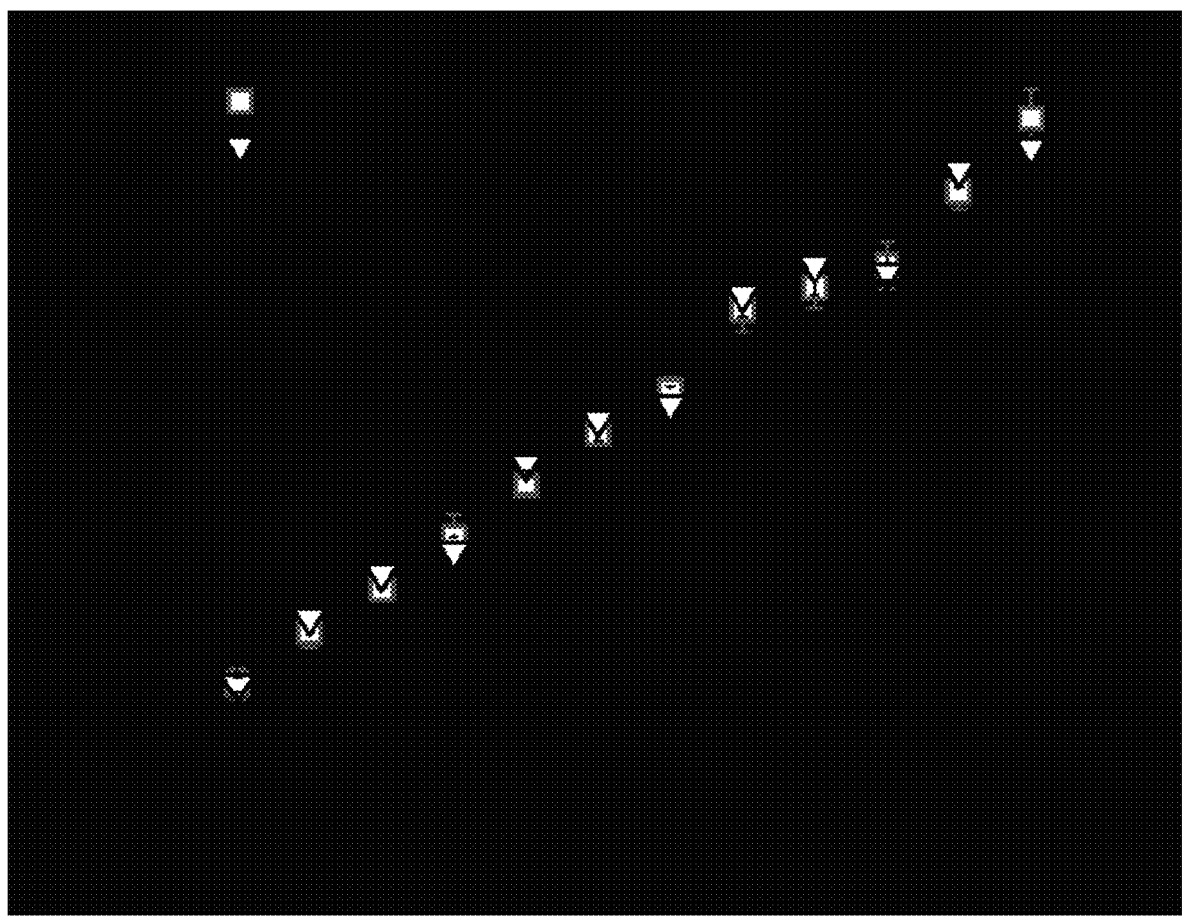
FIG. 13 is a graph showing comparisons of measured charges of droplets departing from TIED-G and TENG as a function of We. It is clear that there is no notable difference in the amount of measured charges of droplets departing from TIDE-G and TENG, regardless of the We, suggesting that the enhanced electricity generation from our TIDE-G is not from the contact electrification. Error bars denote the standard error value from three measurements.
Figures 14A, 14B:
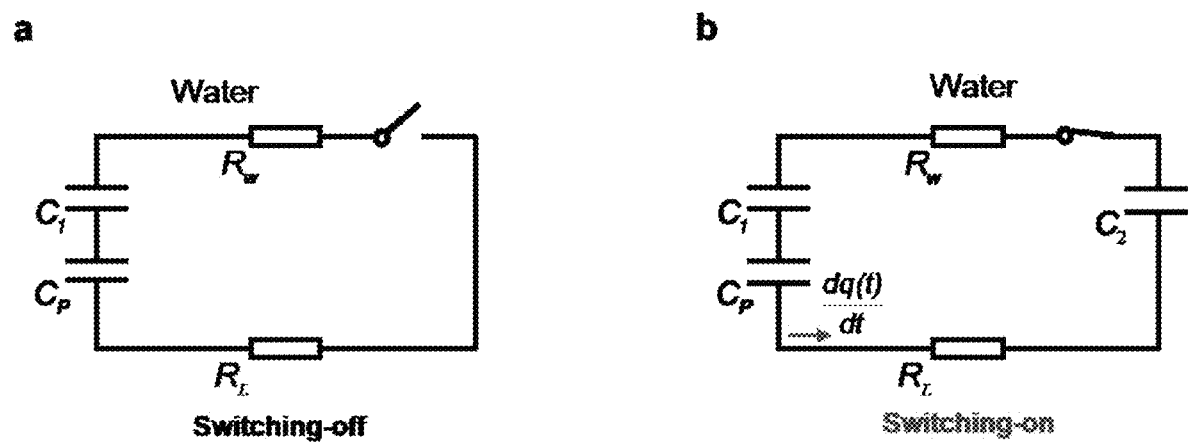

Fabrication of TIDE-G Device. To fabricate the TIDE-G, a piece of ITO glass slide of 30 mm×30 mm×0.4 mm was first ultrasonically cleaned in acetone and ethanol for 10 mins, respectively. Then, the precursor, polytetrafluoroethylene (PTFE), was deposited on the ITO glass using drop-casting method, followed by heating at 120° C. for 15 mins to remove all solvent in the PTFE precursor. The film thickness of the PTFE film can be adjusted by controlling the volume of precursor (Extended Data FIG. 13). To construct the drain electrode, a tiny conductive Al tape with a size of 1 mm×5 mm was assembled onto the as-prepared PTFE film. Control devices with PDMS thin film and commercial Polypropylene (PP) tape as the dielectric layer were also prepared with the similar process. The PDMS film was formed on an ITO glass by curing a mix liquid of polydimethylsiloxane and curing agent (ration 10:1) with a certain of volume.

Characterization and Electrical Measurement. The spreading and retraction dynamics of water droplets were recorded by a high-speed camera (Photron FASTCAM SA4) at a typical recording speed of 6000 fps. The voltage output of TIDE-G was measured using an oscilloscope (Rohde&schwarzrte, RTE1024) equipped with a high-impedance (10 MO) probe. The current and the transferred charges between the ITO (source) and Al electrode (drain) were measured using the oscilloscope coupled with a low-noise current preamplifier (Stanford Research System Model SR570) and a faraday cup connected with nanocoulomb meter (MONROE Model 284), respectively. The volume of water droplets was fixed at 100 µL and the as-fabricated device was tilted at 45° for rapid liquid detachment. To measure the variation of maximum charges $Q_{max}$ transferred from source to drain as a function of the Weber number or the maximum spreading area, the releasing heights of droplet were varied between 1 and 20 cm. In typical measurements, the relative humidity and the environment temperature were kept at approximately 40% and 20° C., respectively.

Molecular Dynamics Simulations. To simulate the EDL formation process when water droplet contacting with the as-fabricated device, molecular dynamics (MD) simulations were carried out in this work. TIP4P/ICE[39] water model is employed, which is a popular water model in the theoretical studies on water. Various properties of water, e.g. melting point, density, and phase diagram etc., have been successfully reproduced by using TIP4P/ICE. Because TIP4P/ICE is a rigid model, we introduced the sodium ions and chlorine ions with identical amount into water to study charges movement. The MD system includes 40000 water molecules with 808 $Na^+$ and 808 $Cl^-$ being dissolved in water. To mimic the experimental setup, rigid and smooth hydrophobic atomic layers are used to represent the PTFE and electrode, respectively. 800 negative and 800 positive charges were fixed with spacing of 8.7 Å, respectively, on the atomic layers of PTFE and electrode, and each site was charged ±e, as depicted in Extended Data FIG. 14. Water molecules with dissolved $Na^+$ and $Cl^-$ ions were initially equilibrated for 3 ns of MD simulations at 300 K without any charge on the substrates. Then, 5 ns MD simulations in the NVT ensemble at 300 K were carried out. The box size of the model is 17.3 nm×17.3 nm×31.4 nm. Periodic boundary conditions were applied in the x and y direction. The parameters for $Na^+$ and $Cl^-$ were taken from previous studies[40] ($\sigma_{Na}$=2.876 Å, $\varepsilon_{Na}$=0.5216 kJ/mol, $\sigma_{Cl}$=3.785 Å, $\varepsilon_{Cl}$=0.5216 kJ/mol). The cross LJ interaction parameters between water and sodium and chlorine ions were given by Lorentz-Berthelot rule. The interactions between substrate atoms and NaCl water solution were described by 12-6 LJ potential ($\sigma_{Na\text{-}sub}$=3.021 Å, $\varepsilon_{Na\text{-}sub}$=0.4785 kJ/mol, $\sigma_{Cl\text{-}sub}$=3.476 Å, $\varepsilon_{Cl\text{-}sub}$=0.4785 kJ/mol, $\sigma_{O\text{-}sub}$=3.458 Å, $\varepsilon_{O\text{-}sub}$=0.6223 kJ/mol). Fast smooth particle-mesh Ewald method was used for electrostatic interactions with a real-space cutoff 10 Å. The van der Waals interactions were truncated at 10 Å. Newton's equations of motion were integrated with a time step of 1 fs by leap-frog algorithm in the MD simulations. Nosé-Hoover scheme was used to control constant temperature of the systems. All the MD simulations were carried out by using Gromacs 4.5.5 software.

The present invention is further elaborated as follows.

The Effect of Continuous Droplet Impinging on Electricity Generation

Figures 5A, 5B, 5C:
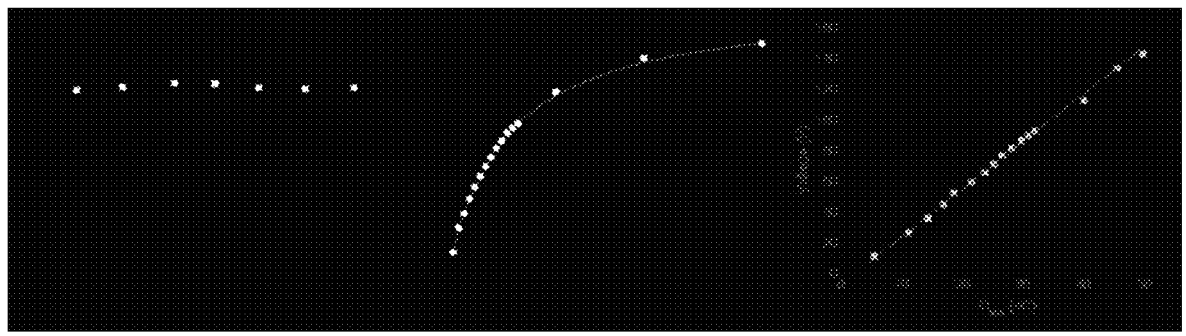

The aforementioned discussion has demonstrated that TIDE-G made of PTFE loaded with sufficient charges allows for the reversible and efficient electricity generation. It is to be noted that the sufficient charges on PTFE can be achieved by continuous droplet impinging. FIG. 1a plots the variation of the output voltage measured from an individual impinging droplet as a function of the number of droplet impinging. The $Q_{max}$ and the output voltage increase gradually with increasing of droplet impinging times, followed by reaching an eventual plateau with the charge and voltage stabilized at 50.2 nC and 143.5 V, respectively, after impinging of 1.6×10$^4$ times (see FIG. 1c). Furthermore, this charge-loading method is applicable to a wide range of thickness of PTFE film. Our result shows that the maximum transferred charges are comparable after water droplet impinging of same times (1.6×10$^4$) with various thickness of PTFE film from 6.7 µm to 16.9 µm (see FIG. 4b). It is noted that the voltage linearly increases with thickness of PTFE film, which agree well with the tendency predicting by the circuit model (see FIG. 5c).

Comparison with Conventional TENG

Figures 8A, 8B, 8C, 8D:
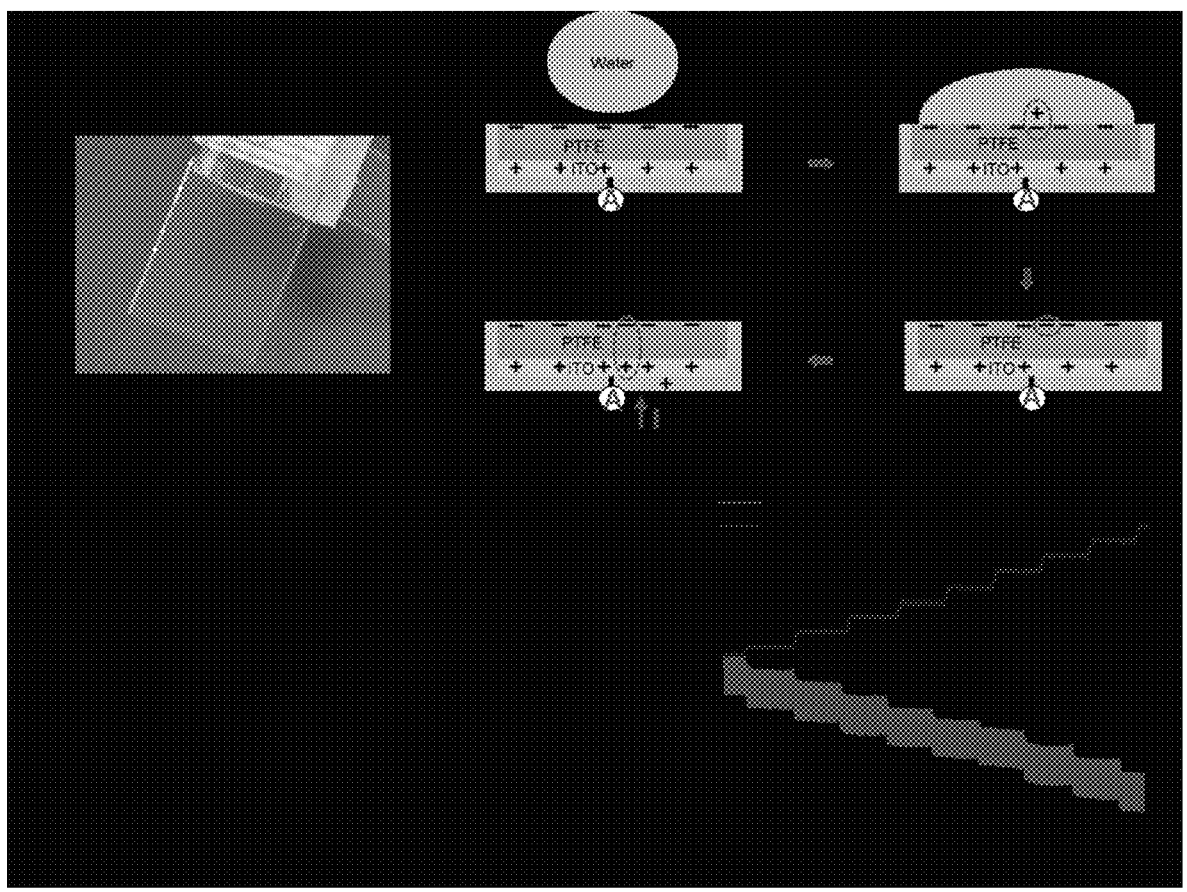

To illustrate the unique advantage of our transistor-like design, we also characterized the performances of the control sample that is designed without the use of transistor-like configuration, i.e. triboelectric nanogenerator (TENG). Note that the PTFE surface of TENG is prepared using the same method as in the case of TIDE-G. FIGS. 8a and 8b show the optical image of the as-fabricated droplet-based TENG as well as the schematic drawing of its basic working mechanism, respectively. Prior to the contact of droplet with the PTFE, the amount of charges on ITO (positive) is the same as that of the PTFE (negative) because of the electrostatic induction. Thus, there is no current flow from ITO to ground (i). When a water droplet leaves the PTFE surface after impacting (ii), it becomes positively charged while the PTFE is more negatively charged as a result of contact electrification. Accordingly, a current flow between the ground and ITO electrode is induced (iv). As shown in FIGS. 8c and 8c for a single droplet, the output voltage and the amount of transferred charges is ~−0.4 V and ~0.075 nC, respectively, both of which are negligible as opposed to those in the case of TIDE-G. Moreover, for each experiment, the amount of the transferred charges in TENG is measured to be identical with the charge carried by the departing droplet (see FIG. 8d), confirming that the electricity generation from the TENG indeed originates from the triboelectric effect, an interfacial phenomenon by nature. Note that by continuous droplet impinging or ion-injection method, the amount of negative charges on PTFE surface can be enhanced, which can then induce positive charges on ITO. However, these positive charges could not be released from ITO due to the attraction by these negative charges on PTFE, and there is no pronounced electricity generation, which is in striking contrast to the case of TIDE-G. All these results convincingly highlight the unique advantage of TIDE-G, which is characterized with a bulk effect and hence a dramatically enhanced electricity generation.

Maximum Spreading Area $A_{max}$

During the course leading the present invention, the dependence of the maximum spreading area $A_{max}$ on the surface charge under a fixed impacting We=100 was also studied. As shown in the FIG. 12, for the PTFE film without loaded charges, the maximum spreading area $A_{max}$ is measured at 2.71 cm$^2$, which is comparable with the $A_{max}$ measured in the case of the PTFE with the loaded charges (2.72 cm$^2$). This result suggests that the maximum spreading area is insensitive to the surface charges on PTFE film.

Circuit Analysis

In this section, we discuss the entire droplet and device from the circuit perspective[6]. When a droplet spreads on the PTFE surface loaded with sufficient negative charges, the base contact area with the PTFE dynamically varies as a function of time. A capacitor $C_P$ is formed with the water/PTFE as the top plate and PTFE/ITO as the bottom plate, respectively. For a specific water/PTFE contact area, the voltage across the capacitor can be expressed as $d\sigma_P/\varepsilon_P$, where $\sigma_P$, $\varepsilon_P$ and d are the surface charge density, the dielectric constant and the thickness of the PTFE, respectively. At the water/PTFE interface, there exists an additional capacitor, $C_1$. Prior to the contact of the impinging droplet with the drain electrode, there is no capacitor formed at the water/drain interface. As a result, $C_P$ and $C_1$ stay in an open-circuit and there is no charge flow between them (Extended Data FIG. 10a). In contrast, with the connection of the drain electrode and PTFE rendered by the gating liquid (switching-on mode), the other capacitor $C_2$ is established at the water/drain interface. Thus, $C_1$, together with $C_P$ and $C_1$, form a close-circuit. In this circuit, the time dependent capacitance of $C_P$, $C_1$ and $C_2$ and can be expressed as $$C_P(t) = \frac{A(t)\varepsilon_P}{d}, \quad C_1(t) = \frac{A(t)\varepsilon_w}{\lambda_{EDL}} \text{ and } C_2(t) = \frac{A_1(t)\varepsilon_w}{\lambda_{EDL}},$$

respectively, where $A(t)$ and $A_1(t)$ are the time-dependent contact area of the water/PTFE interface and the water/drain interface, respectively, $\varepsilon_w$, $\lambda_{EDL}$ are the dielectric constant of PTFE and the width of EDL, respectively. The equivalent circuit is shown in Extended Data FIG. 10b, which is governed by the following differential equation as $$(R_L + R_W)\frac{dq(t)}{dt} = \frac{[\sigma_P A(t) - q(t)]}{C_P(t)} - \frac{q(t)}{C_1(t)}\lambda_{EDL} - \frac{q(t)}{C_2(t)}\lambda_{EDL}, \quad (1)$$

$$q(t=0) = 0 \quad (2)$$

where $q(t)$ is the transfer charges, $R_L$ and $R_W$ are the impedances of the external load and water droplet, respectively. The maximum voltage on $C_P$ occurred at the critical time point $t=0$ is equal to the voltage established across the PTFE film, which is consistent with our experimental measurement.

TABLE 1

Physical properties of NaCl solution at 20° C.

| NaCl Concentration (mol · L$^{-1}$) | Surface tension (mN/m) | Conductivity (S · m$^{-1}$) | Dielectric constant (Relative to vacuum) |
|---|---|---|---|
| DI Water | 72.2 | 0.0003 | 81 |
| 10$^{-6}$ | 72.5 | 0.0006 | 80.6 |
| 10$^{-5}$ | 72.6 | 0.0007 | 80.1 |
| 10$^{-4}$ | 72.8 | 0.009 | 79.8 |
| 10$^{-3}$ | 72.9 | 0.02 | 79.5 |
| 10$^{-2}$ | 73.1 | 0.18 | 79.2 |
| 10$^{-1}$ | 73.3 | 3.5 | 78.7 |
| 0.6 | 73.3 | 4 | 72.9 |

It should be understood that certain features of the invention, which are, for clarity, described in the content of separate embodiments, may be provided in combination in a single embodiment. Conversely, various features of the invention which are, for brevity, described in the content of a single embodiment, may be provided separately or in any appropriate sub-combinations. It is to be noted that certain features of the embodiments are illustrated by way of non-limiting examples. It is also to be noted that certain features in connection with the invention are not explained in great detail for brevity reason. However, such features are readily understood by a skilled person in the art. For example, a skilled person would understand that the automation of the system can be achieved by linked different components in the systems. Also, a skilled person in the art will be aware of the prior art which is not explained in the above for brevity purpose.

REFERENCE

The following references are incorporated in their entirety and a skilled person is considered to be aware of disclosure of these references.

1 Lin, Z.-H., Cheng, G., Lee, S., Pradel, K. C. & Wang, Z. L. Harvesting Water Drop Energy by a Sequential Contact-Electrification and Electrostatic-Induction Process. *Adv. Mater.* 26, 4690-4696 (2014).

2 Jeon, S.-B., Kim, D., Yoon, G.-W., Yoon, J.-B. & Choi, Y.-K. Self-cleaning hybrid energy harvester to generate power from raindrop and sunlight. *Nano Energy* 12, 636-645 (2015).

3 Xiong, J. et al. Wearable all-fabric-based triboelectric generator for water energy harvesting. *Adv. Energy Mater.* 7, 1701243 (2017).

4 Jin, S. et al. Large-area direct laser-shock imprinting of a 3D biomimic hierarchical metal surface for triboelectric nanogenerators. *Adv. Mater* 30, 1705840 (2018).

5 Xu, W. et al. (In press) SLIPS-TENG: robust triboelectric nanogenerator with optical and charge transparency using slippery interface. *Nat. Sci. Rev.* (2019).

6 Kwon, S.-H. et al. An effective energy harvesting method from a natural water motion active transducer. *Energy & Environmental Science* 7, 3279-3283 (2014).

7 Wang, Z. L. New wave power. *Nature* 542, 159-160 (2017).

8 Zhu, G. et al. Harvesting water wave energy by asymmetric screening of electrostatic charges on a nanostructured hydrophobic thin-film Surface. *ACS Nano* 8, 6031-6037 (2014).

9 Scruggs, J. & Jacob, P. Harvesting ocean wave energy. *Science* 323, 1176-1178 (2009).

10 Dhiman, P. et al. Harvesting energy from water flow over graphene. *Nano letters* 11, 3123-3127 (2011).

11 Logan, B. E. & Elimelech, M. Membrane-based processes for sustainable power generation using water. *Nature* 488, 313-319 (2012).

12 Siria, A. et al. Giant osmotic energy conversion measured in a single transmembrane boron nitride nanotube. *Nature* 494, 455 (2013).

13 Chen, X. et al. Scaling up nanoscale water-driven energy conversion into evaporation-driven engines and generators. *Nature Commun.* 6, 7346 (2015).

14 Feng, J. et al. Single-layer MoS2 nanopores as nanopower generators. *Nature* 536, 197-200 (2016).

15 Schroeder, T. B. H. et al. An electric-eel-inspired soft power source from stacked hydrogels. *Nature* 552, 214-218 (2017).

16 Xue, G. et al. Water-evaporation-induced electricity with nanostructured carbon materials. *Nature Nanotechnol.* (2017).

17 Huang, Y. et al. Interface-mediated hygroelectric generator with an output voltage approaching 1.5 volts. *Nature Commun.* 9, 4166 (2018).

18 Horowitz, P. & Hill, W. *The art of electronics* (Cambridge Univ. Press, 1989).

19 Yin, J. et al. Generating electricity by moving a droplet of ionic liquid along graphene. *Nature Nanotechnol.* 9, 378-383 (2014).

20 Xie, Y. et al. High-efficiency ballistic electrostatic generator using microdroplets. *Nature Commun.* 5 (2014).

21 Park, J., Yang, Y, Kwon, S. H. & Kim, Y. S. Influences of surface and ionic properties on electricity generation of an active transducer driven by water motion. *J. Phys. Chem. Lett.* 6, 745-749 (2015).

22 Krupenkin, T. & Taylor, J. A. Reverse electrowetting as a new approach to high-power energy harvesting. *Nature Commun.* 2, 448 (2011).

23 Nie, J. et al. Power generation from the interaction of a liquid droplet and a liquid membrane. *Nature Commun.* 10, 2264 (2019).

24 Sun, Q. et al. (In press) Printing surface charge as a new paradigm to program droplet transport. (2019).

25 Cui, L. et al. The comparative studies of charge storage stabilities among three PP/porous PTFE/PP electret. *J. Electrost.* 67, 412-416 (2009).

26 Yatsuzuka, K., Mizuno, Y. & Asano, K. Electrification phenomena of pure water droplets dripping and sliding on a polymer surface. *J. Electrost.* 32, 157-171 (1994).

27 Zhao, P. et al. Emulsion electrospinning of polytetrafluoroethylene (PTFE) nanofibrous membranes for high-performance triboelectric nanogenerators. *ACS Appl. Mater. Interfaces* 10, 5880-5891 (2018).

28 Wang, S. et al. Maximum surface charge density for triboelectric nanogenerators achieved by ionized-air injection: methodology and theoretical understanding. *Adv. Mater.* 26, 6720-6728 (2014).

29 Liu, Y. et al. Pancake bouncing on superhydrophobic surfaces. *Nat. Phys.* 10, 515-519 (2014).

30 Bird, J. C., Dhiman, R., Kwon, H.-M. & Varanasi, K. K. Reducing the contact time of a bouncing drop. *Nature* 503, 385 (2013).

31 Richard, D., Clanet, C. & Quéré D. Contact time of a bouncing drop. *Nature* 417, 811-811 (2002).

32 Bartolo, D., Josserand, C. & Bonn, D. Retraction dynamics of aqueous drops upon impact on non-wetting surfaces. *J. Fluid Mech.* 545, 329-338 (2005).

33 Nelson, W. C. & Kim, C.-J. C. Droplet actuation by electrowetting-on-dielectric (EWOD): A review. *J. Adhes. Sci. Technol.* 26, 1747-1771 (2012).

34 Verheijen, H. & Prins, M. Reversible electrowetting and trapping of charge: model and experiments. *Langmuir* 15, 6616-6620 (1999).

35 Moon, J. K., Jeong, J., Lee, D. & Pak, H. K. Electrical power generation by mechanically modulating electrical double layers. *Nature Commun.* 4, 1487 (2013).

36 Park, J. et al. Identification of Droplet-Flow-Induced Electric Energy on Electrolyte-Insulator-Semiconductor Structure. *J. Am. Chem. Soc.* 139, 10968-10971 (2017).

37 Kjellander, R. & Marcělja, S. Correlation and image charge effects in electric double layers. *Chem. Phys. Lett.* 112, 49-53 (1984).

38 Nguyen, V. & Yang, R. Effect of humidity and pressure on the triboelectric nanogenerator. *Nano Energy* 2, 604-608 (2013).

39 Matito, E., Duran, M. & Sola, M. The aromatic fluctuation index (FLU): a new aromaticity index based on electron delocalization. *J. Chem. Phys.* 122, 014109 (2005).

40 koneshan, S. R., Jayendran C.; Lynden-Bell, R M; Lee. Solvent Structure, Dynamics, and ion mobility in aqueous solutions at 25° C. *J. Phys. Chem. B* 102, 4193-4204 (1998).

The invention claimed is:

1. An electricity generator powered by impacting and impinging liquid droplets, comprising a plurality of electricity generator units, each said electricity generator unit includes a glass substrate defining an upwardly facing surface and a downwardly facing surface, wherein said substrate includes i) a region with only a polytetrafluoroethylene (PTFE) coat on the upwardly facing surface and ii) an electrode arranged adjacent said PTFE coated region on the upwardly facing surface in that the said PTFE coated region and said electrode are positioned on the upwardly facing surface to receive an impacting and impinging water droplet, and wherein circuitry of said generator connects said PTFE coated region and said electrode via an electrical connection passing the downwardly facing surface, and electricity is harvested via said electrical connection, and wherein said electricity generator units are connected in series or in parallel to form the electricity generator.

2. An electricity generator as claimed in claim 1, wherein said glass substrate is an ITO glass slide or a portion of an ITO glass slide.

3. An electricity generator as claimed in claim 2, wherein said PTFE film has a thickness of 13.4 μm and a density of 2.1 to 2.2 g/cm$^3$.

4. An electricity generator as claimed in claim 1, wherein said PTFE is conformed to exist in a flat film on the upwardly facing surface.

5. An electricity generator as claimed in claim 1, wherein said electrode a conductive aluminum tape.

* * * * *